United States Patent [19]
Biswas et al.

[11] Patent Number: 5,860,000
[45] Date of Patent: Jan. 12, 1999

[54] FLOATING POINT UNIT PIPELINE SYNCHRONIZED WITH PROCESSOR PIPELINE

[75] Inventors: Prasenjit Biswas, Saratoga; Gautam Dewan, Cupertino; Kevin Iadonato, San Jose, all of Calif.; Norio Nakagawa; Kunio Uchiyama, both of Tokyo, Japan

[73] Assignee: Hitachi Micro Systems, Inc., San Jose, Calif.

[21] Appl. No.: 594,763

[22] Filed: Jan. 31, 1996

[51] Int. Cl.$^6$ .................................................. G06F 9/38
[52] U.S. Cl. .................................................. 395/591
[58] Field of Search .................................................. 395/591

[56] References Cited

U.S. PATENT DOCUMENTS

| | | |
|---|---|---|
| 4,171,537 | 10/1979 | Weissberger et al. . |
| 4,729,094 | 3/1988 | Zolnowsky et al. . |
| 4,979,102 | 12/1990 | Tokuume . |
| 5,029,073 | 7/1991 | Takaya et al. . |
| 5,053,631 | 10/1991 | Perlman et al. . |
| 5,129,065 | 7/1992 | Priem et al. . |
| 5,193,159 | 3/1993 | Hashimoto et al. . |
| 5,487,022 | 1/1996 | Simpson et al. . |
| 5,559,977 | 9/1996 | Avnon et al. ............................ 395/591 |
| 5,664,138 | 9/1997 | Yoshida ............................ 395/591 |

OTHER PUBLICATIONS

"Implementing Precise Interrupts in Piplined Processors," IEEE Transactions on Computers, vol. 37, No. 5, May 1988, pp. 562–573.
"SH3: High Code Density, Low Power," IEEE Micro, Dec. 1995, pp. 11–19.
"Hitachi Adds FP, DSP Units to SuperH Chips," Microprocessor Report, Dec. 4, 1995, pp. 10–11.

*Primary Examiner*—William M. Treat
*Attorney, Agent, or Firm*—Graham & James LLP

[57] ABSTRACT

An FPU pipeline is synchronized with a CPU pipeline. Synchronization is achieved by having stalls and freezes in any one pipeline cause stalls and freezes in the other pipeline as well. Exceptions are kept precise even for long floating point operations. Precise exceptions are achieved by having a first execution stage of the FPU pipeline generate a busy signal, when a first floating point instruction enters a first execution stage of the FPU pipeline. When a second floating point instruction is decoded by the FPU pipeline before the first floating point instruction has finished executing in the first stage of the FPU pipeline, then both pipelines are stalled.

8 Claims, 31 Drawing Sheets

Microfiche Appendix Included
(1 Microfiche, 64 Pages)

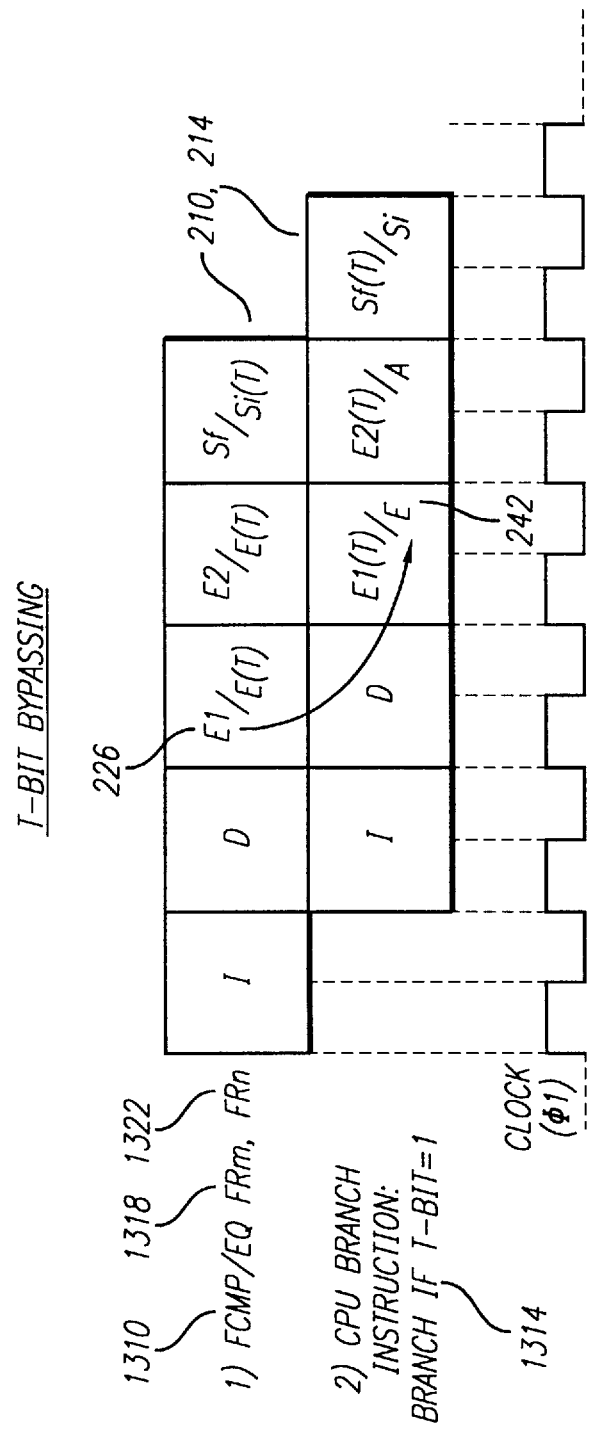

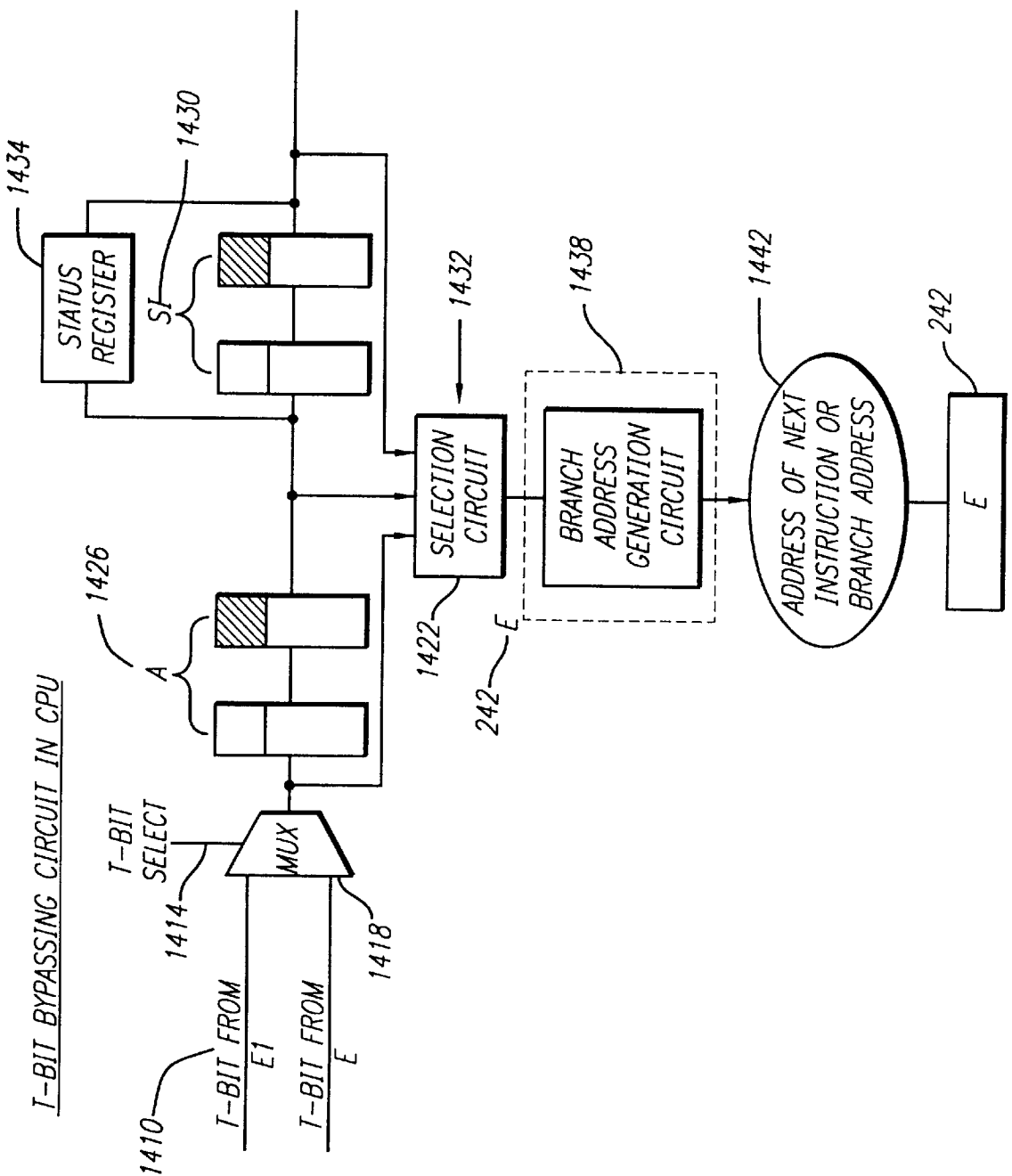

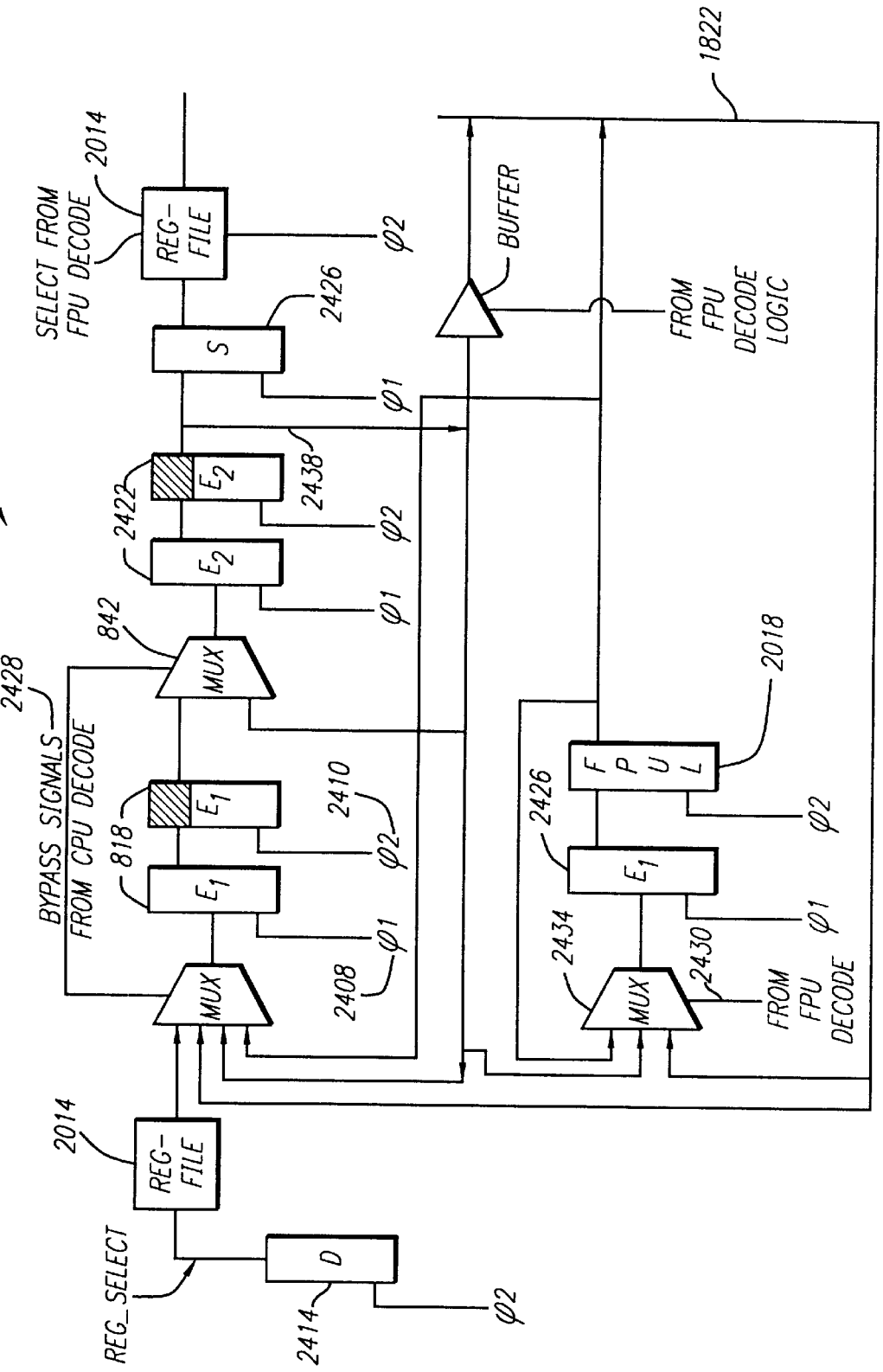

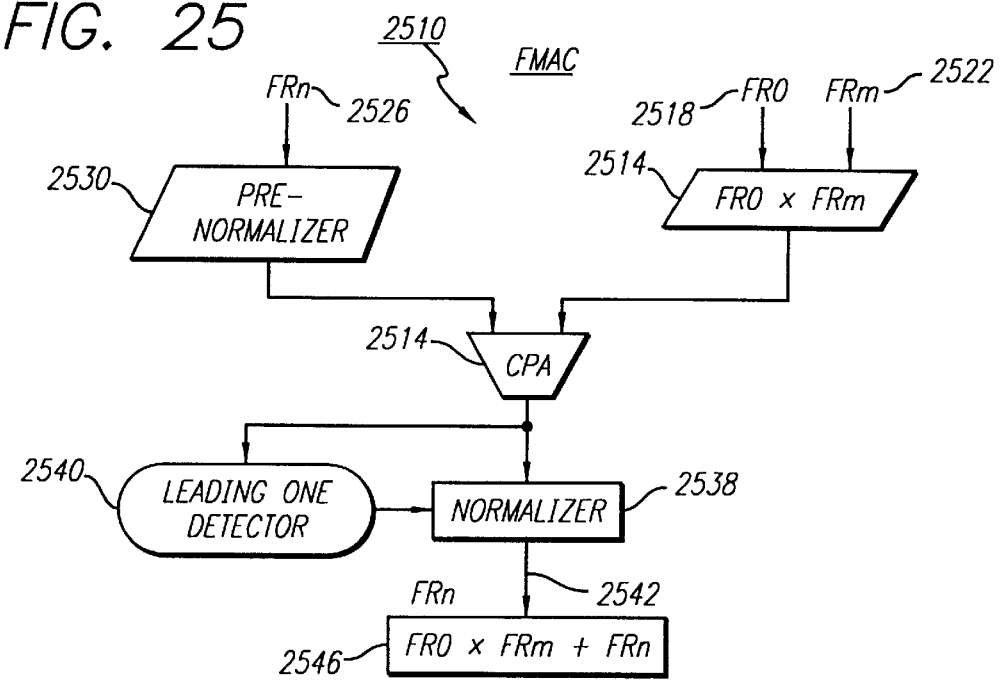
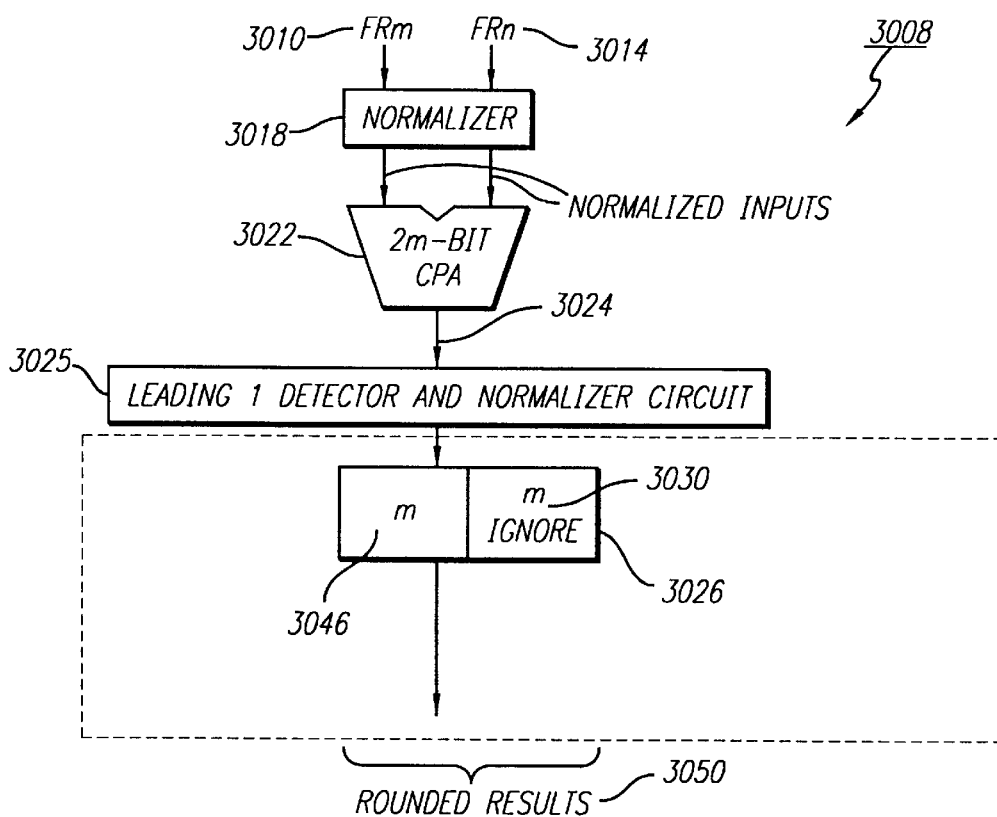

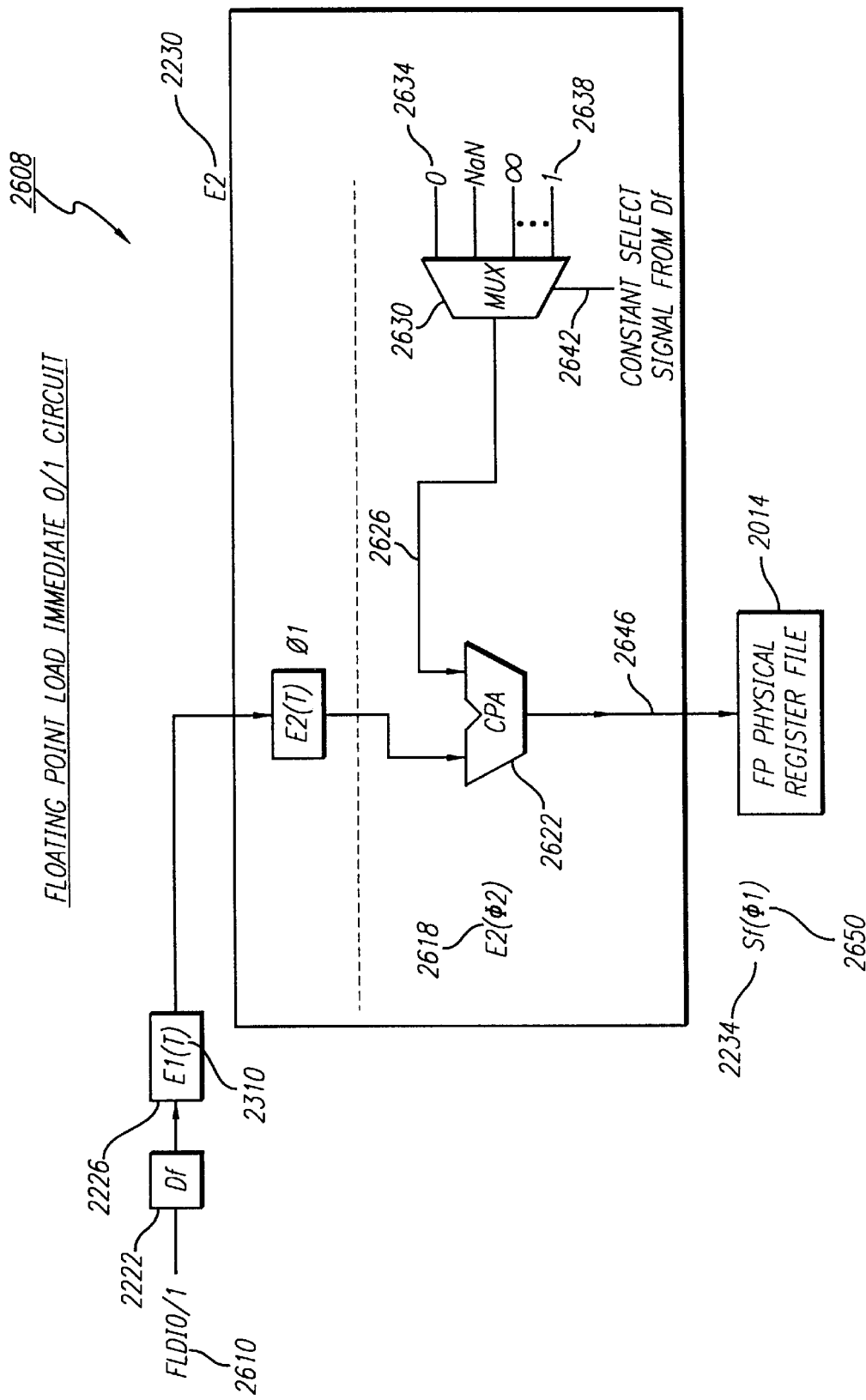

FLOATING POINT UNIT PIPELINE SYNCHRONIZED WITH PROCESSOR PIPELINE

CROSS REFERENCE TO MICROFICHE APPENDIX

This patent application incorporates sixty-two (62) frames of a microfiche appendix entitled "APPENDIX A" and referred to hereafter as "Appendix A."

BACKGROUND OF THE INVENTION

Some RISC (Reduced Instruction Set Computer) microprocessors have FPU's (Floating Point Unit). A floating point unit is a circuit for executing floating point computations. RISC is a computer architecture that uses relatively simple, fixed size instructions to reduce the complexity of the microprocessor. Most instructions in a RISC architecture operate on operands available in general purpose registers and store result in a register. These registers are loaded from memory and typically register contents are reused during execution of a program. Most RISC architectures have 16 or more general purpose registers.

Typical RISC microprocessors have the capability to pipeline instruction execution. There are a number of problems in coordinating the activities of multiple function units (e.g., an integer pipeline of a CPU and a floating point pipeline). If any of the two units in such a machine share resources, then synchronizing the activities of the two pipelines plays a major role in the solution to the problems.

Another problem is maintaining precise exception semantics. Handling exceptions or interrupts precisely on pipelined or multi-function unit architecture implies that when an exception or interrupt occurs it should be possible to save the state of the machine which should be precisely the same as the program executing on a completely sequential version of the architecture. Even if the instruction issuing order to the function units maintains strict program order, the instruction completion (or state updating) order could be out of order due to differences in execution time of instructions in different function units. Several effective means of implementing precise interrupts in pipelined processors have been discussed in the article "Implementing Precise Interrupts in Pipelined Processors," IEEE Transaction on Computers, pp. 562–573, May 1988. Most of the modern pipelined multi-function unit processors implement variations of the techniques presented in this reference.

Some of these techniques require additional register files and, significantly, complex logic for control. Typically, synchronization of resource sharing requires a tag matching hardware at the inputs of function units as well as more complex internal data buses connecting the shared resources. Other techniques use register score boarding for identifying and resolving register resource conflicts. These techniques, in essence, require additional die area and are not suitable for inexpensive processors meant for embedded applications.

Floating point instructions in typical RISC architectures have a length of at least thirty-two bits. An example of such a RISC microprocessor is a Power PC. Power PC's were introduced by IBM and Motorola. Similarly, MIPS, another RISC-based microprocessor, also requires thirty-two bits for each floating point instruction. MIPS microprocessors are made by MIPS Computer Systems, Inc., of Sunnyvale, Calif.

FIG. 17 illustrates a typical 32-bit length floating point instruction 1710 for the Power PC. Seventeen bits of instruction 1710 are dedicated to the operation code 1714. Fifteen bits 1718 of the floating point instruction 1710 are used to address registers. The operation code 1714 of the floating point instruction 1710 operates on the contents of registers addressed using the fifteen bits 1718 to perform the floating point instruction 1710.

One reason that RISC architectures typically require at least thirty-two bit long floating point instructions is because such instructions typically use three operands with registers selected from a bank of thirty-two floating point registers. To address thirty-two registers requires five bits. So, selecting each operand from thirty-two bit registers already requires fifteen bits. Obviously, additional bits are required for the operation code 1714.

There is a related issue of transfer of data between registers of the FPU and registers of a CPU (Central Processing Unit) of the RISC microprocessor. An example of a register is an array of latches. Typically, a floating point unit has registers for storing data in floating point format. Similarly, a CPU has integer registers for storing data in integer format. Transfers of data between integer and floating point registers usually occur via the memory unit, such as cache memory of the RISC microprocessor. For instance, when the FPU needs to transfer data to the CPU, the FPU first transfers data from a floating point register to the cache memory. Second, the CPU retrieves this data stored in the cache memory for storage in the CPU register. However, access to cache memory for data storage or retrieval is relatively slow compared to data access for storage or retrieval from a register. Moreover, the capability to access memory requires die area for the memory access circuits for the FPU and the CPU. But die area is at a premium in, for example, embedded applications. Embedded applications are those where, for instance, a processor is dedicated to a particular function, such as a game. Some more complex RISC processors dedicate a direct path for data transfer between the CPU and the FPU registers. However, this additional path requires an increase in die area.

SUMMARY OF THE INVENTION

A processor uses a floating point pipeline to execute floating point operations and an integer pipeline to execute integer and memory addressing operations. The floating point pipeline is synchronized with the processor pipeline. Principally, synchronization of the FPU pipeline and the CPU pipeline is achieved by having stalls and freezes on either one of these pipelines effect stalls and freezes on both pipes.

This invention further relates generally to a 32-bit RISC architecture with a 16-bit fixed length floating point instruction set. Reducing the floating point instruction length to only sixteen bits saves memory space for storage of a computer program. For example, reducing the floating point instruction length from thirty-two bits to sixteen bits cuts the memory required for storing these instructions by half. Reducing instruction size reduces the cache miss rate, because more instructions can be stored in the cache memory. Furthermore, reducing the floating point instruction length improves the instruction fetch latency. The 16-bit instructions are fetched in 32-bit blocks. Consequently, a single fetch from memory can obtain two instructions, whereas for 32-bit instructions it is possible to fetch only one instruction per memory access. Reducing the floating point instruction length permits reduction in the size of the memory required for storing the floating point instructions, thus reducing the die area used for on-chip cache memory.

For efficiency, this embodiment may not support all of the exceptions of the IEEE floating point standard No. 754. Also, all of the IEEE rounding modes are not necessarily supported. Similarly, if the result of a value generating floating point operation is a denormalized number, it is flushed to zero. All these above deviations from the IEEE floating point standard save die area and execution cycle time.

BRIEF DESCRIPTION OF THE DRAWINGS

FIG. 13 illustrates FPU and CPU pipeline synchronization for a sequence of a floating point compare instruction followed by a CPU branch instruction, in accordance with a preferred embodiment of the invention.

FIG. 14 is a diagram illustrating a circuit for bypassing a T-bit from the E1 stage to the E stage, in accordance with a preferred embodiment of the invention.

FIG. 24 is a more detailed circuit diagram of the FPU pipeline, in accordance with a preferred embodiment of the invention.

FIG. 25 is a diagram illustrating a basic FMAC circuit that executes an FMAC instruction, in accordance with a preferred embodiment of the invention.

FIG. 26 is a diagram illustrating a circuit for executing the load immediate floating point "0" or load immediate floating point "1" instruction, in accordance with a preferred embodiment of the invention.

FIG. 30 is a diagram illustrating a circuit for rounding floating point numbers to zero, in accordance with a preferred embodiment of the invention.

DETAILED DESCRIPTION OF THE PREFERRED EMBODIMENTS

This patent application is related to the concurrently filed patent application Ser. No. 08/594,750, entitled "Microprocessor Including Floating Point Unit With 16-bit Fixed Length Instruction Set" by the inventors Prasenjit Biswas, Shumpei Kawasaki, Norio Nakagawa, Osamu Nishii, and Kunio Uchiyama, which is incorporated herein below and referred to herein as "Reference '750."

In a preferred embodiment of this invention, a processor uses a floating point pipeline to execute floating point operations and an integer pipeline to execute integer and memory addressing operations, as further discussed below. The floating point pipeline is synchronized with the processor pipeline.

The FPU pipeline 210 (see FIG. 2) is synchronized with the CPU pipeline 214 in several respects. The FPU and the CPU pipeline 210, 214 are synchronized with each other, for example, when an instruction shares FPU 114 (see FIG. 1) and CPU 118 resources, such as a floating point load/store/restore instruction (see page A30 of the Appendix A). Similarly, the FPU and CPU pipeline 210, 214 are synchronized when they exchange data by use of the communication register FPUL (see FIG. 4; see also FIG. 4 of Reference '750). Also, there is pipeline synchronization when a sequence of instructions includes, for instance, a floating point compare instruction followed by a CPU branch instruction. Synchronization of these two pipelines 210, 214 is used to maintain precise exceptions, as discussed further below.

Figure 1:
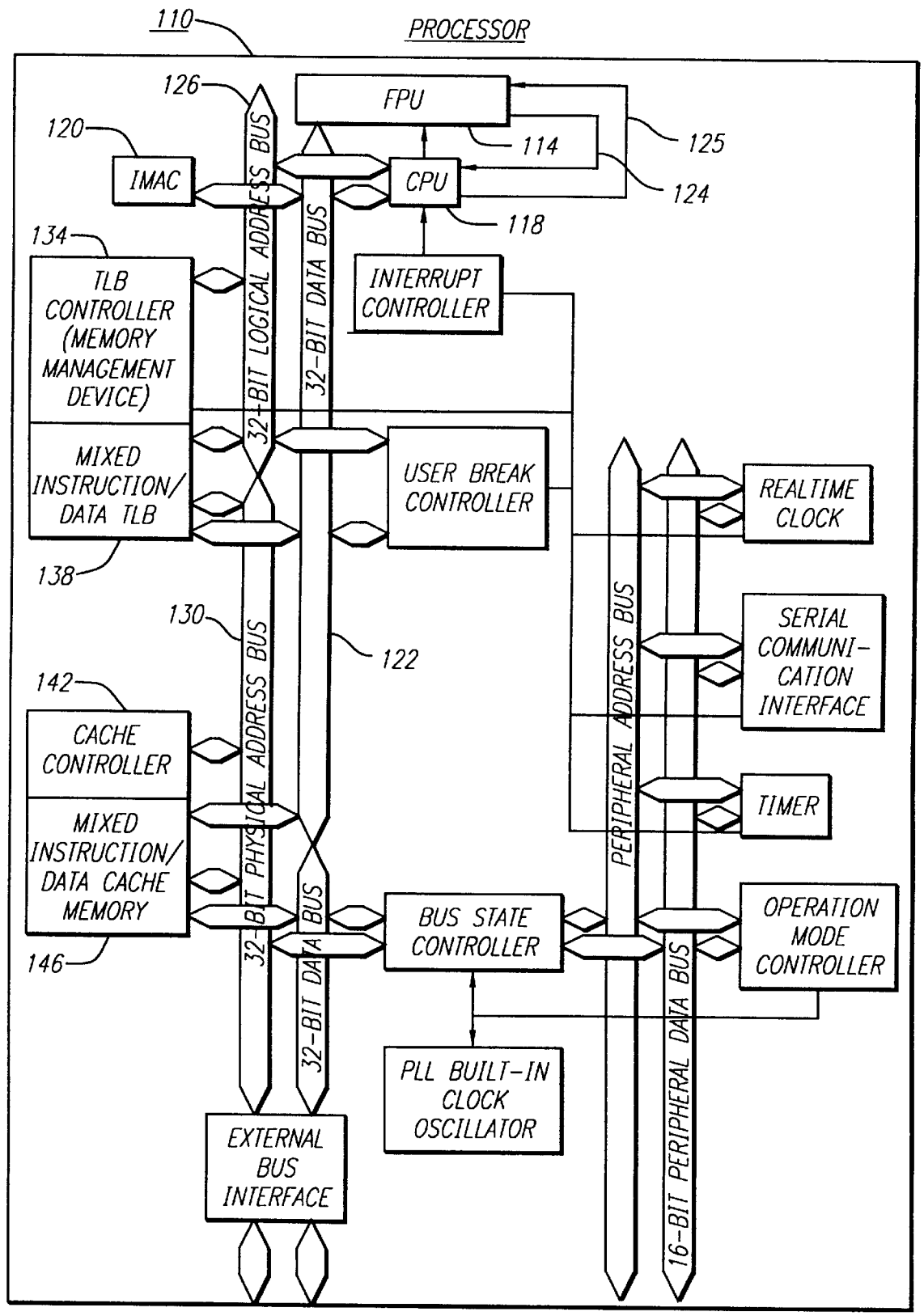
FIG. 1 is a diagram illustrating a circuit for a processor including a Floating Point Unit (FPU), in accordance with a preferred embodiment of the invention.

FIG. 1 shows a diagram for a processor of this embodiment of the present invention. Processor 110 has a Floating Point Unit (FPU) 114. In addition, the processor 110 has a Central Processing Unit (CPU) 118, which has the capability of operating on integers. Processor 110 is a 32-bit RISC architecture with a 16-bit fixed length floating point instruction set. Details of sixteen bit instructions for the CPU 118 only have been discussed in the Article "SH3: High Code Density, Low Power," IEEE Micro, pp. 11–19, December 1995, which is hereby incorporated by reference. The CPU 118 is coupled to the FPU 114 via a 32-bit data bus 122. An Integer Multiplication and Accumulation Unit (IMAC) 120 is coupled to the data bus 122. Interface signals between the circuits of FIG. 1 are not shown except for the interface signals 124 and 125 between the CPU 118 and the FPU 114 (see Appendix A, pages A58 to A59). The CPU 118 is coupled via a 32-bit logical address bus 126 to a memory management device 134 (TLB controller). TLB stands for Translation Look Ahead Buffer. The TLB controller 134 controls a mixed instruction/data TLB 138. The TLB 138 is coupled via a 32-bit physical address bus 130 to a cache controller 142. The cache controller 142 controls a mixed instruction/data cache memory 146. The cache memory 146 is coupled via the 32-bit data bus 122 to the CPU 118 and the FPU 114. Based on this description and descriptive names in FIG. 1, the functions of additional circuits illustrated in FIG. 1 are self-explanatory to one of ordinary skill in the art.

The function of the processor 110 can be understood by the following example. The FPU 114 may require data or an instruction from memory for a floating point operation. In this embodiment, the FPU 114 does not have the capability of addressing memory to retrieve data from or store data in cache memory 146. This saves die area by obviating the need for FPU memory addressing circuitry. Instead, the CPU 118 addresses the cache memory in place of the FPU 114. Not only does the CPU 118 initiates fetching of data from memory for the FPU 114, the CPU 118 also fetches from memory all instructions including floating point instructions for the FPU 114. Furthermore, as explained in greater detail below, data transfers between the FPU 114 and the CPU 118 are conducted without memory access but instead through faster register access.

To obtain data or an instruction, the CPU 118 requests data or instructions from memory 116 by computing and sending a logical (i.e., virtual) address to the memory management device 134 via the 32-bit logical address bus 126.

If the corresponding physical address is not already stored in the TLB 138, then a TLB miss occurs and the TLB controller 134 initiates a program sequence to convert (translate) the logical address into a physical address using additional mapping information. The memory management device 134 then stores the physical address in the TLB 138. The TLB 138 stores the address for future use, when the CPU 118 again may request data at the same address range. The TLB 138 sends the physical address via the 32-bit physical address bus 130 to the cache controller 142. The cache controller 142 instructs the mixed instruction/data cache memory 146 to place the data or instruction on the 32-bit data bus 122. If the requested address is not available in the cache memory 146, a cache miss occurs and CPU 118 and FPU 114 processing is frozen by application of a cache miss signal (c2_sbrdy [see page A58 of the Appendix A] until the required information is fetched to the cache from external memory. An instruction is picked up for decoding by both the CPU 118 as well as the FPU 114. Instruction of data is available on a common 32-bit data bus shared by the CPU 118 and the FPU 114. The FPU 114 preferably does not have the capability of initiating memory addressing for data and/or instruction fetch.

Any exchange of data between the CPU 118 and the FPU 114 occurs via a dedicated communication register FPUL. As discussed above, typically in other RISC processors data exchange between the CPU 118 and the FPU 114 occur via a transfer through memory, such as cache memory 146. Transfer via cache 146 is relatively slow compared to transfer via registers, such as the FPUL register.

A complete list of the floating point instructions and of the CPU instructions related to the floating point instructions is shown on page A30 of the Appendix A. These instructions are described in detail in the Appendix A on pages A31–A57 and include C language descriptions of the instruction. These instructions, as listed in the Appendix A, show underlines that have no significance regarding the meaning of the instructions.

Figure 2:
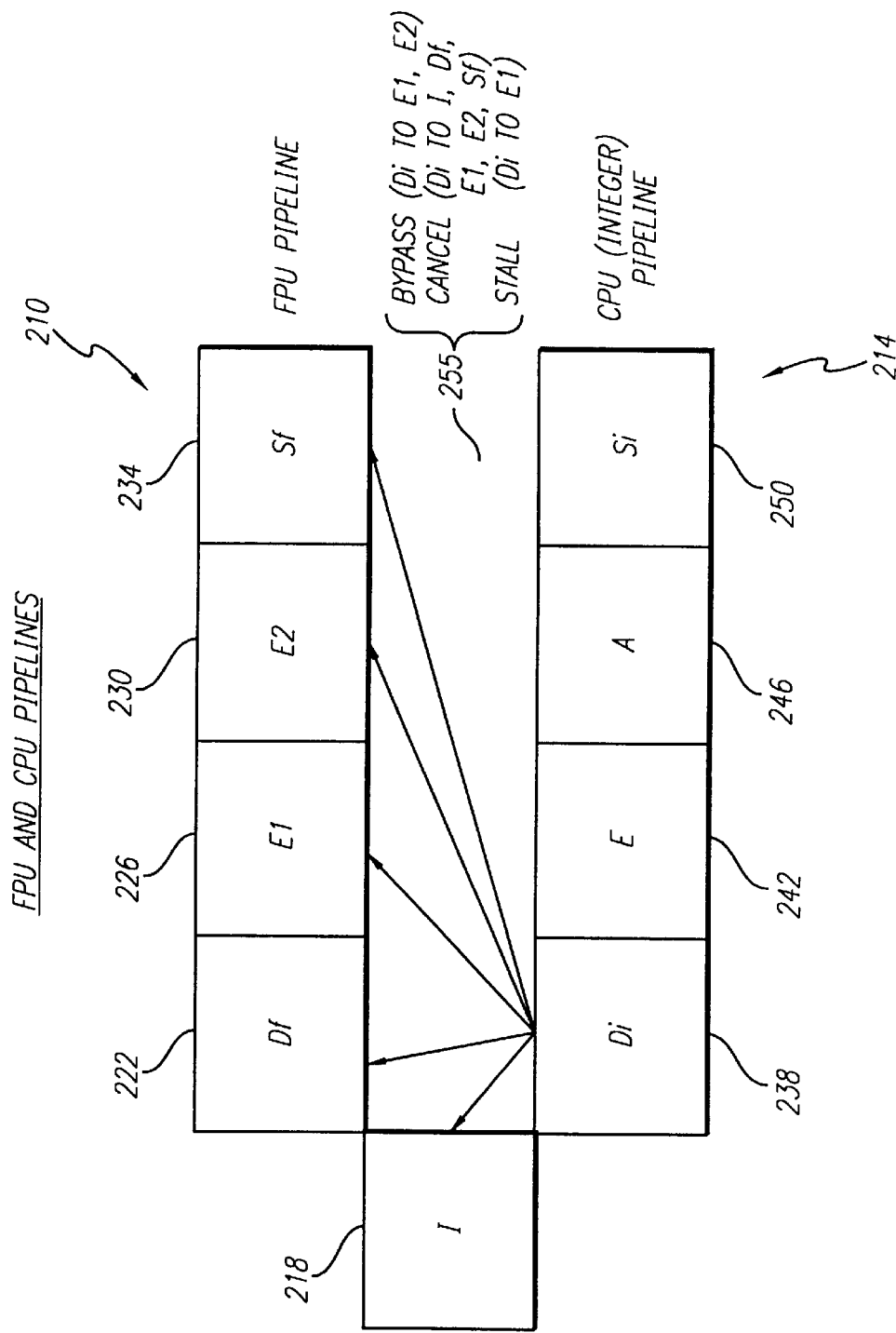
FIG. 2 illustrates pipelines of the FPU and the CPU, in accordance with a preferred embodiment of the invention.

FIG. 2 illustrates the pipelines that the FPU 114 and the CPU 118 use to execute instructions. The FPU pipeline 210 and the CPU pipeline 214 share a single instruction fetch stage 218. In addition, the FPU pipeline 210 has four more stages: a decode stage Df 222, a first execution stage E1 226, a second execution stage E2 230, and a write back stage Sf 210. Similarly, the CPU pipeline 214 has four additional stages: a decode stage Di 238, an execution stage E 242, a memory access stage A 246, and a write back stage Si 250. The Di stage 238 generates the signals for bypass, stall, and cancel for the FPU pipeline stages as shown in FIG. 2 by the arrows 255. The Di stage 238 provides via signal paths 255 bypass signals to the E1 and E2 stages 226, 230, cancel signals to all of the FPU stages 222, 230, 234, including the shared I stage 218, and stall related signals to the Df stage 222 and a stall signal to the E1 stage 226. These signals are further explained below.

An instruction available on the data bus 122 is initially retrieved by the instruction fetch stage 218. From the instruction fetch stage, both decode stages Df 222 and Di 238 decode the fetched instruction. The first phase of decode stage involves identifying whether an instruction is a CPU or FPU instruction. An FPU instruction is identified by an F (Hex) in the high order four bits of the instruction. If an instruction is not of floating point type, the Df stage 222 does not decode the instruction any further. Similarly, the Di stage 238 does not completely decode a floating point instruction. The Di stage 238 does not decode a floating point instruction to identify the floating point function to be performed. This results in significant reduction in hardware complexity. If only a single decode stage were used, all signals required to control an FPU data path would have to cross over from the CPU 118 to the FPU 114 causing an increase in die area. When the fetched instruction is a floating point instruction, the E1 stage 226 of the FPU pipeline 210 begins executing the instruction. The E2 stage 230 of the FPU pipeline 210, then completes the execution of this floating point instruction. Depending on the requirements of the instruction, the Sf stage 234 of the FPU pipeline 210 can store the result of the instruction in a floating point register.

Similarly, for the case when the fetched instruction is a CPU instruction, such as an instruction for operating on integers, the E 242 stage of the CPU pipeline 214 executes the instruction. The A stage 246 of the CPU pipeline 214 accesses cache memory 146, when called for by the particular instruction being executed. Finally, the Si stage 250 of the CPU pipeline 214 can write the result of the instruction into, for example, one of the CPU registers 2010 (see FIG. 20). Advantageously, instructions that require only the use of one of the two pipelines, FPU 210 or CPU 214 pipeline, result in the instructions simply being pushed through the pipeline that is not being used. For example, when the instruction fetch stage 218 fetches an integer addition, the CPU pipeline CPU 214 executes this integer addition in the execution stage 242 and then stores the results in a register in the Si stage 250. However, having decoded the integer add instruction, the Df stage 222 of the FPU pipeline 210 pushes the integer add instruction through the E1 stage 226. The integer add instruction continues being pushed through the remaining stages of the FPU pipeline 210 during subsequent clock cycles. Similarly, when the fetched instruction is a pure floating point instruction, the Di stage 238 pushes the floating point instruction through the E stage 242 and during subsequent cycles through the remaining stages of the CPU pipeline 214.

Figure 3A:
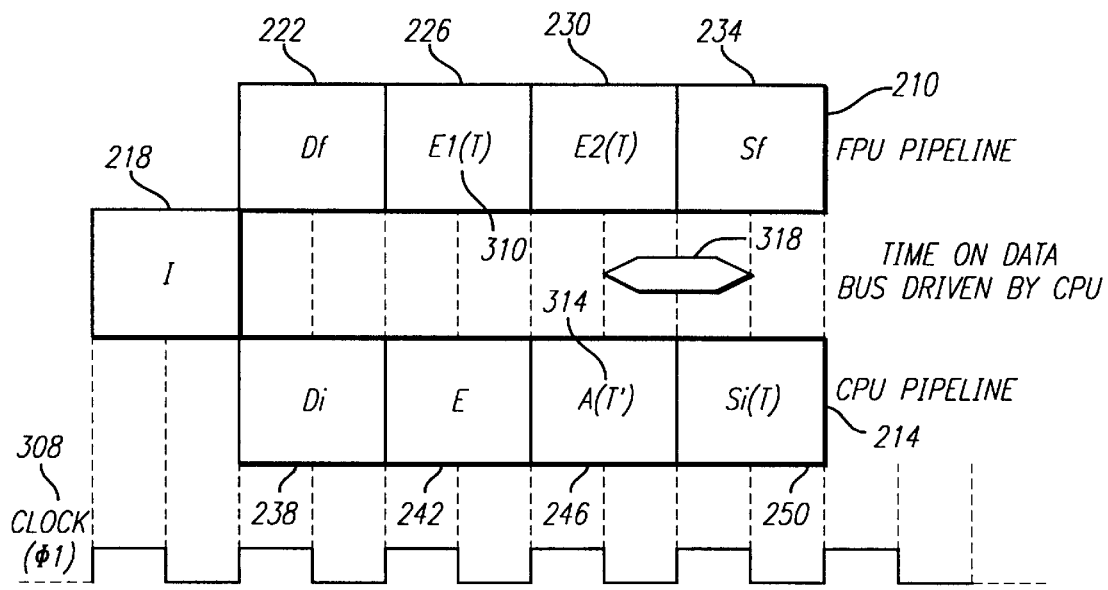
FIG. 3 (a and b) shows a diagram of the FPU pipeline and the CPU pipeline and the timing for the transfer of data between these two pipelines, in accordance with a preferred embodiment of the invention.

Some instructions call for data movement between the FPU pipeline 210 and the CPU pipeline 214. An example of such an instruction is the CPU load to communication register instruction "LDS Rm, FPUL", shown in FIG. 3(a). FIG. 3(a) shows the FPU pipeline 210 and the CPU pipeline 214 and the timing for the transfer of data between these two pipelines 210, 214. The pipeline structure is as explained in FIG. 2. Note that each stage of the pipeline also corresponds to a single clock cycle of, for instance, a phase one clock 308, (for clarity, a phase two clock is not shown). The CPU load to communication register instruction is a CPU 118 instruction. But as explained above, all instructions are decoded by both decode stages 222, 238 of the FPU and CPU pipelines 210, 214. So, upon decoding the CPU load to communication register instruction, the Df stage 222 determines that the FPU pipeline 210 will be involved, since the FPU 114 controls access to the FPUL register. Initially, the CPU load to communication register instruction is executed by the CPU pipeline 214 in the E stage 242. At the same time, the E1 stage 226 of the FPU pipeline 210 passes the instruction through without any action, as designated by the letter "T"310. In other words, the CPU load to communication register instruction simply is pushed through the E1 stage 310.

Each stage of the pipelines 210, 214 takes one cycle to execute. But there are special situations when an instruction spends more than one cycle in a pipeline stage. In that case, an instruction is re-circulated through that particular pipeline stage. For example, the floating point divide instruction "FDIV", as shown on page A39 of the Appendix A, has a latency of thirteen cycles. Here, latency is a measure of the total number of cycles that an instruction spends in the execution stages 226, 230 of, for instance, the FPU pipeline 210. A floating point instruction spends one cycle in the E2 stage 230, from which it is apparent that the floating point divide instruction spends twelve cycles in the E1 stage 226. Also shown on page A39 of the Appendix A is the pitch of the floating point divide instruction, which is generally the measure of the clock cycles before an instruction following the current instruction can start execution in a pipeline. For example, the next instruction following the floating point divide instruction can begin execution after twelve cycles, since the pitch of the floating point divide instruction equals twelve cycles. A pitch of value twelve indicates that the floating point divide instruction spends twelve cycles in the E1 stage 226. Consequently, the next floating point instruction has to wait twelve clock cycles before entering the E1 stage 226.

Returning to the example of the load to communication register instruction, since the same instruction flows in both the FPU and the CPU pipelines 210, 214, the resources of the E1 stage 226 will be held for the same amount of cycles that the E stage 242 of the CPU pipeline 214 executes. Next, the A stage 246 of the CPU pipeline 214 sources the contents of the register, referenced "Rm" in the LDS CPU load to communication register instruction, onto the data bus 122. Since this is not an instruction that requires cache memory access, the A stage 246 only loads the data bus from the CPU register file 410. A T' 314 indicates that no memory access takes place.

While the CPU pipeline is placing the contents of register "Rm" on the data bus 122, the E2 stage 230 of the FPU pipeline 210 is pushing the instruction through without any action, as indicated by the letter "T". The CPU stage A 246 makes the contents of the register Rm available on the data bus 122 for a limited period of time, data-ready time 318. This is the time that the data bus is busy with the data transfer related to the CPU load to communication register instruction. During the period 318 that the data is available on the data bus 122, the write back stage Sf 234 of the FPU pipeline 210 retrieves the data on the data bus 122 and stores it in the register FPUL.

Figure 3B:
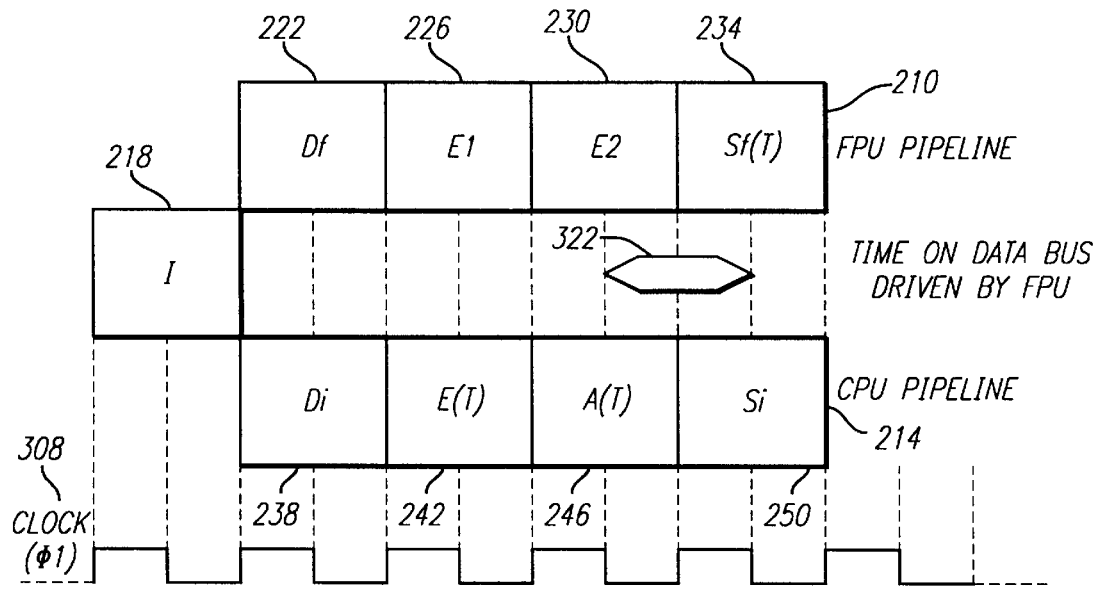

The CPU store instruction "STS FPUL, Rn" is executed similarly by the two pipelines 210 and 214, as shown in FIG. 3(b). The CPU store instruction copies the contents of FPUL register into a CPU general purpose register Rn. However, in the case of the CPU store instruction, the FPU 114 controls the period 322, the time that the contents of the FPUL register is available on the data bus 122.

Figure 4:
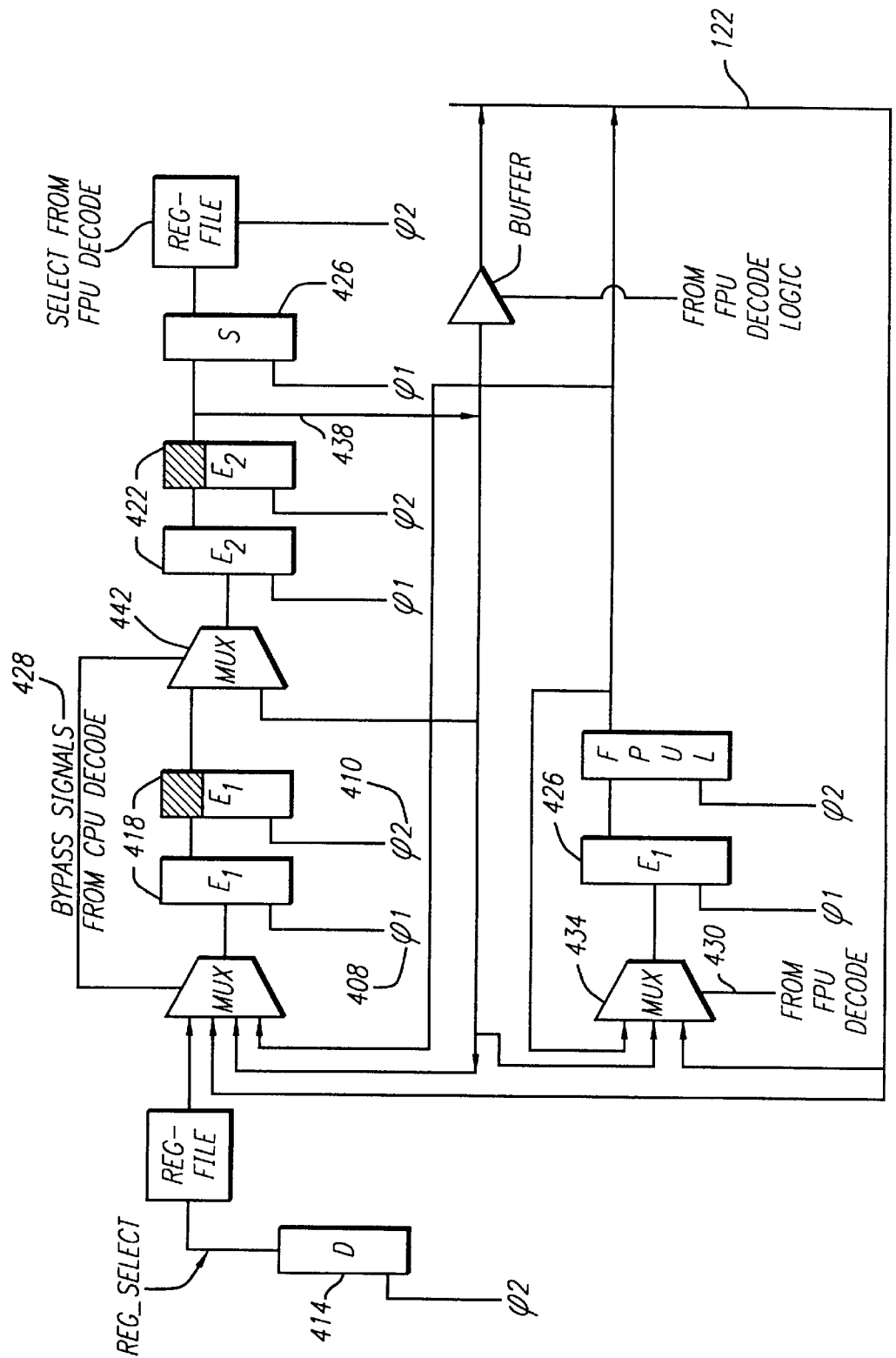
FIG. 4 is a more detailed circuit diagram of the FPU pipeline, in accordance with a preferred embodiment of the invention.

FIG. 4 is a more detailed circuit diagram 406 of the FPU pipeline 210. Shown in the circuit of FIG. 4 are latches 414, 418, 422, and 426 included in the FPU pipeline stages 222, 226, 230, and 234, respectively. The FPU pipeline stages 222, 226, 230, and 234 store their outputs in their respective latches 414, 418, 422, and 426 at either a down edge of a first phase of the clock 408 or at a down edge of a second phase of the clock 410. Also shown are bypass signals 428 as further discussed below. The function of the FPU pipeline circuit 406 is illustrated by examples discussed immediately and also further below. In the example of the CPU load to communication register instruction, the FPU decode stage Df 222 controls the retrieval of the contents of register Rm from the data bus 122 by asserting a select signal on the select signal path 430 of a multiplexer 434, such that the data is loaded into the FPUL register.

Figure 5:
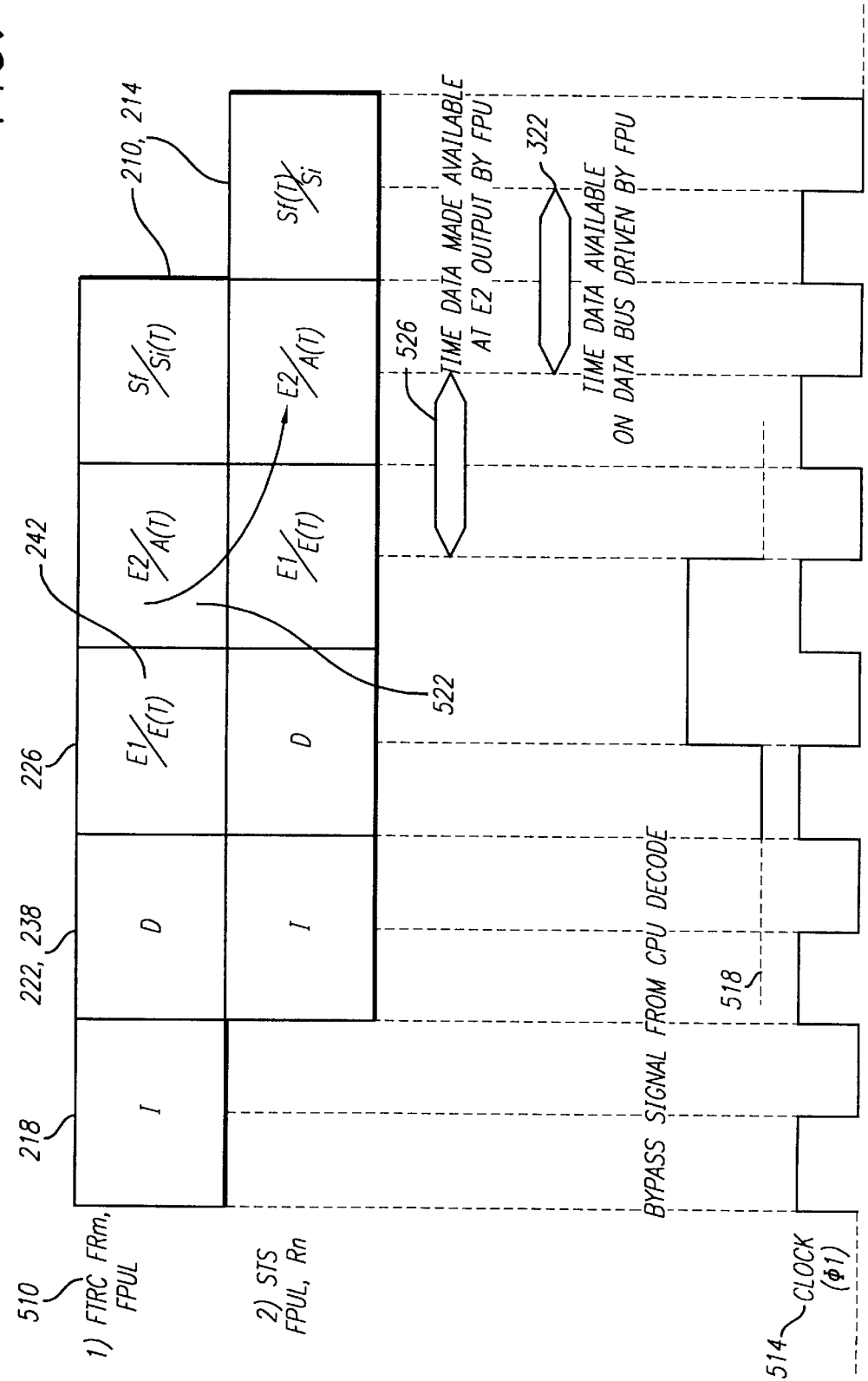
FIG. 5 illustrates synchronization of the FPU and CPU pipelines, when executing a sequence of a floating point and a CPU instruction.

FIG. 5 shows synchronization of pipeline 210 and 214 with each other in a sequence of two instructions, one CPU instruction and one FPU instruction. In particular, FIG. 5 illustrates a floating point truncate and convert to integer instruction 510 (see page A49 of Appendix A) followed by the CPU store instruction discussed above. In FIG. 5, the individual pipeline stages of floating point unit and CPU pipelines 210, 214 are merged into one series of blocks for simplicity of illustration. So, for example, instead of showing two decode stages, a single block is shown with the letter "D" designating Df 222 and Di 238. As above, time elapses from left to right, as illustrated by phase one of the clock signal 514 (for simplicity, phase two is not shown). This pipeline representation is standard in the art, except that for further clarification the letter "T" has been inserted in parentheses in a pipeline stage designation, when a corresponding stage simply passes the instruction through.

For example, while the execution stage E1 226 of the floating point unit FPU pipeline 210 is executing the floating point truncate instruction 510, the execution stage E 242 of the CPU pipeline 214 is simply pushing the instruction through without any action, as indicated by the letter "T." To avoid a stall in the CPU pipeline 214 when the CPU pipeline 214 is executing the store instruction, the CPU decode stage 238 asserts a bypass signal 522 on the bypass signal path 255. Asserting the bypass signal 522 allows making available the output of the E2 stage 230 of the FPU pipeline 210 to the input of the E2 stage 230 after the E2 stage 230 has finished executing the floating point truncate instruction 510 and once the E2 stage is ready to execute its part of the store instruction.

The pipeline circuit of FIG. 4 accomplishes this bypass of data. The output of the E2 stage latches 422 is available on the bypass path 438. The bypass path 438 is an input to the multiplexer 442. The bypass signals 428 from the CPU decode stage 238 selects the output of the E2 stage latches 422, so that it can be recycled through the E2 stage 230. The time that the result of the floating point truncate instruction 510 is available at the output latches 422 of the E2 stage 230 is indicated in FIG. 5 at 526. The bypass signal 428 from the CPU Di stage 238 becomes active at the proper time to make possible the transfer of data through the multiplexer 442. As already explained, the FPU 114 controls the period 322 that the data is available on the data bus 122 for transferring to the CPU register Rn. Additional examples of bypassing are listed and illustrated in the Appendix A on pages A60–A61. These bypasses include bypasses to the FMAC 2510 (see FIG. 25), which is a part of the E1 stage 226. On pages A60–A61, for simplicity, the letter "T" has been omitted, as it is clear from the context where the letter "T" would be appropriate.

Principally, synchronization of the FPU pipeline 210 and the CPU pipeline 214 is achieved by having stalls and freezes on either one of these pipelines 210, 214 effect stalls and freezes on both pipes. As shown in FIG. 2, the decode stage Di 238 of the CPU pipeline stalls the FPU pipeline 210 via the stall signal data path as indicated by arrows 255. A pipeline stall could occur during a sequence of instructions, as for instance, when a first instruction writes to a register, the contents of which are used by a second instruction. To avoid having the second instruction use non-updated contents of the register, the second instruction would stall until the register has been updated by the first instruction. In the current embodiment, such a stall is avoided by bypassing the output of the execution stage E 242 of one instruction to the input of the execution stage E 242 of the following instruction. Similar bypasses exist in the FPU pipe. During a stall, a NOP (no operation) is introduced into the pipeline stage that is stalled (i.e., the E stage 242 or E1 stage 226).

Figure 6:
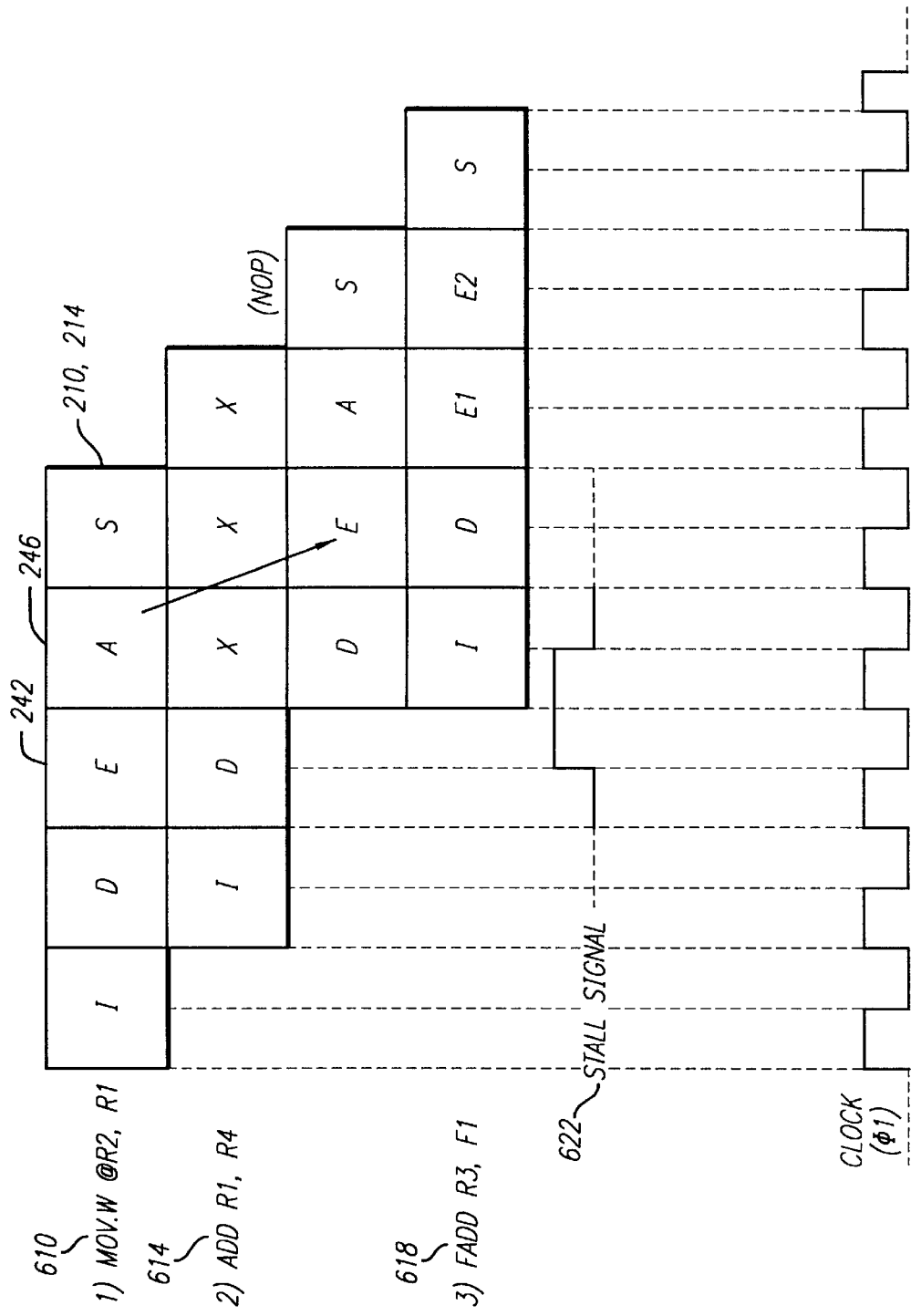
FIG. 6 is a pipeline diagram illustrating a first type of a stall, a load use stall, in accordance with a preferred embodiment of the invention.

The following illustrates additional stall conditions, and an associated circuit. FIG. 6 is a pipeline diagram illustrating a first type of a stall, a load use stall. In FIG. 6 there is a sequence of three instructions 610, 614, and 618. The first instruction 610 as well as the second instruction 614 are CPU instructions. The instruction that is fetched third 618 is a floating point instruction. Instruction 610 is a load instruction that loads the contents of memory 146 at the address contained in register R2 into register R1. The second instruction 614 adds the contents of register R1 to the contents of Register R4. Because the first instruction 610 is accessing memory 146 in the A stage 146 of the CPU pipeline 114, the second instruction 614 is stalled. Otherwise, the second instruction 614 would be accessing non-updated contents of register R1, while the instruction 610 is updating the contents of register R1.

Since a stall in one pipeline causes a stall in both pipelines, the third instruction 618, which is a floating point instruction, is stalled along with the second instruction 614. The D stage 238 of the CPU pipeline 214 generates a stall signal 622 to stall both pipelines 210, 214. To avoid additional stalls, the contents of A stage 246 are bypassed to the E stage 242 of the CPU pipeline 214.

Figure 7:
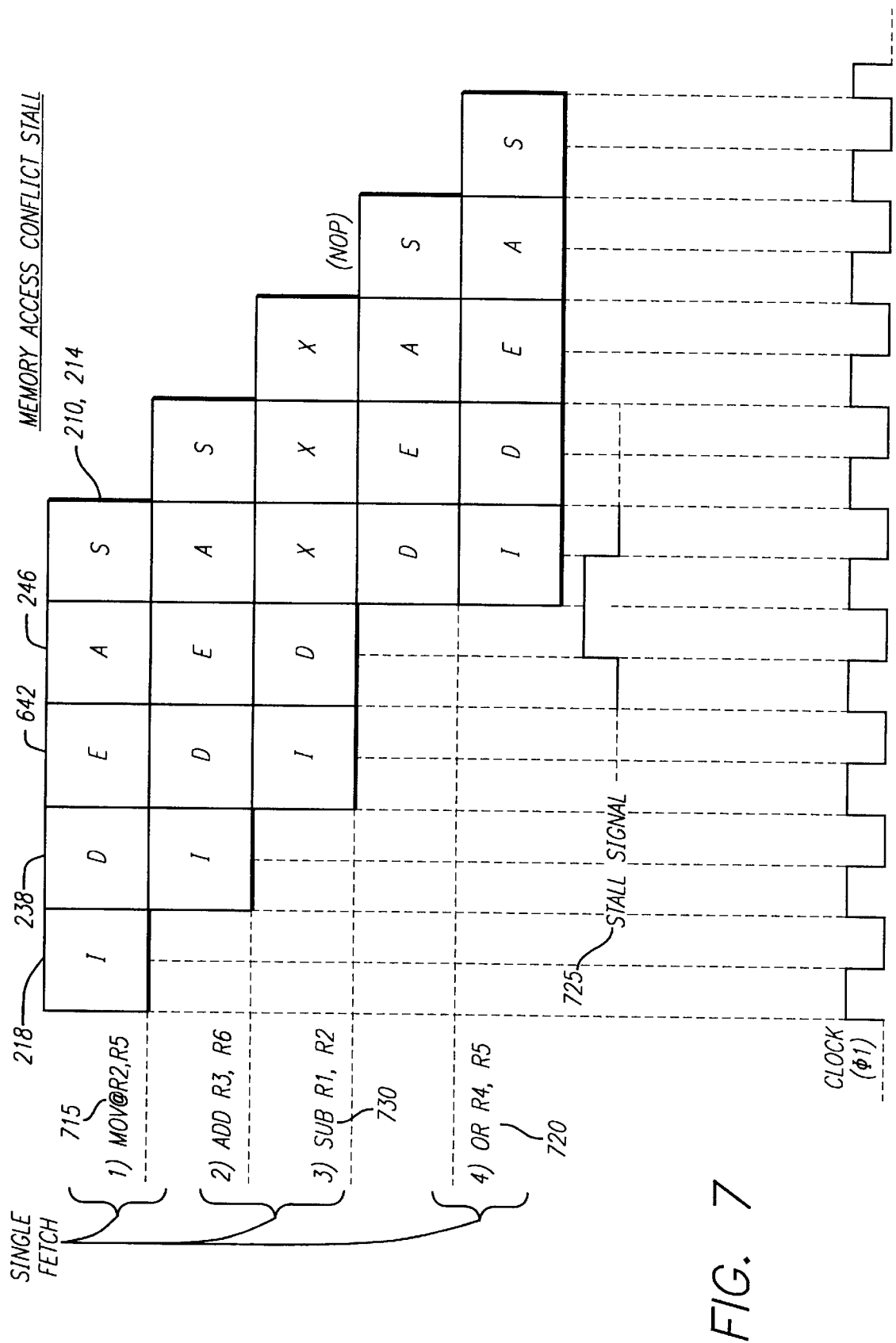
FIG. 7 illustrates another type of stall, a memory access conflict stall, in accordance with a preferred embodiment of the invention.

FIG. 7 illustrates another type of stall, a memory access conflict stall. The stall in FIG. 7 is caused by two instructions attempting to simultaneously access cache memory 146. FIG. 7 shows a pipeline diagram for executing a sequence of four instructions. The first instruction is a CPU load instruction 715 as the CPU load instruction 610 in FIG. 6. Similarly to instruction 610 of FIG. 2, instruction 715 is accessing memory 146.

In FIG. 7, the first instruction 715 is one of two instructions fetched in a single fetch by the instruction fetch stage 218, where, for simplicity, the other instruction fetched is not shown. In FIG. 7, the Di stage 238 stalls both pipelines 210, 214, because the first instruction 715 is accessing memory 146 in the A stage 246 when the instruction stage 218 would be ready to fetch the fourth instruction 720 also from memory 146. Consequently, the fourth instruction 720 is fetched one clock cycle later than it would be without the stall.

In addition, the third instruction 730 is re-circulated in the Di stage 238 by application of the re-circulation signal 1010 as further discussed below in the context of FIG. 10. Moreover, a NOP (no operation) is inserted into the E stage 242 of the third instruction 730 by application of a stall signal 725. Again, both pipelines 210, 215 are stalled, because stalling one stalls the other one as well.

Figure 8:
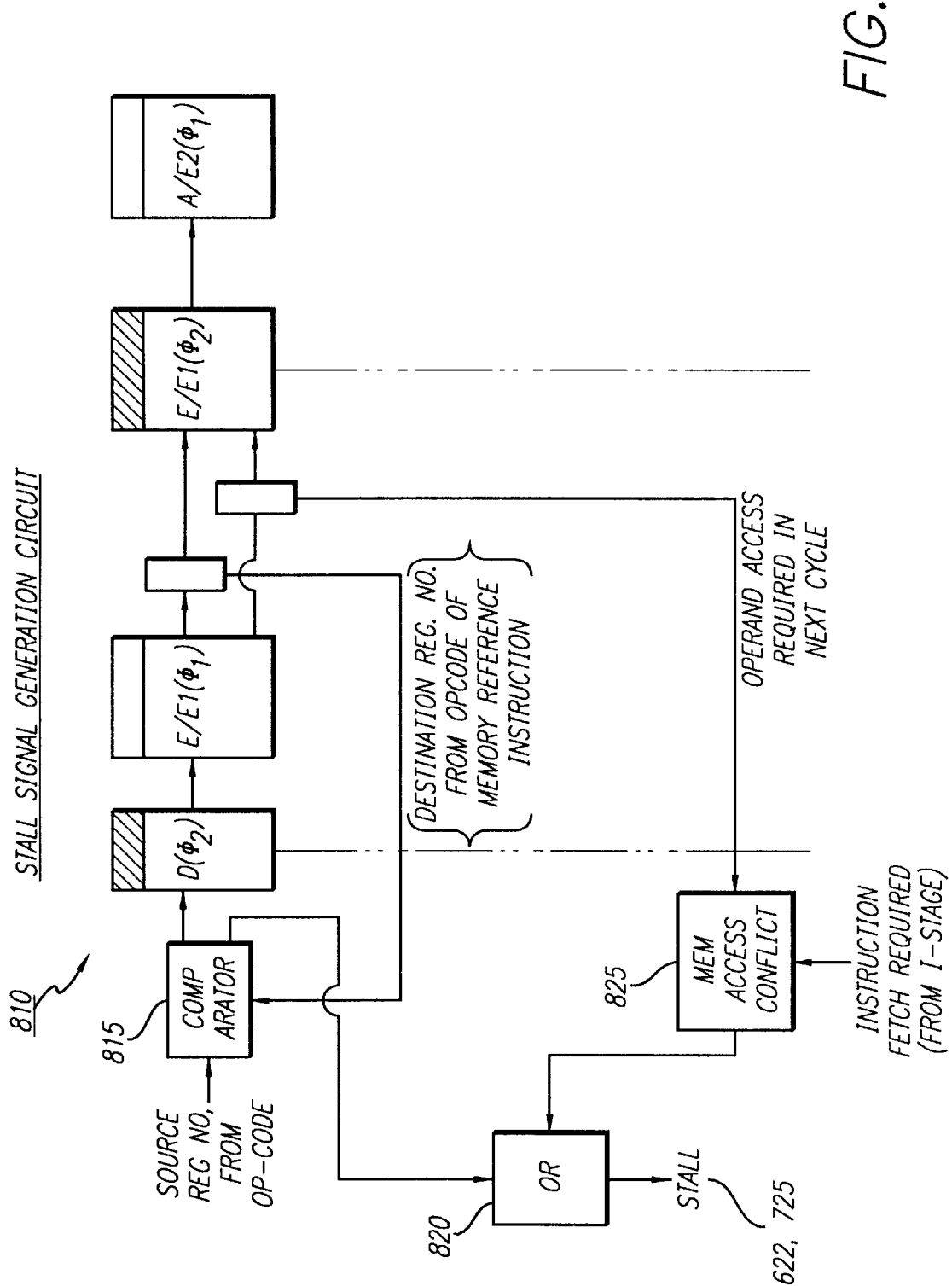
FIG. 8 is a diagram for a circuit that generates the stall signals, in accordance with a preferred embodiment of the invention.

FIG. 8 is a diagram for a circuit 810 (in the Di stage 238 of the CPU pipeline 214) that generates the stall signals 622, 725. To generate the stall signal 622, the circuit 810 uses a comparator 815 to determine if the destination register (e.g., R1 of instruction 610 of FIG. 6) is identical to a source register (e.g., R1 of instruction 614 of FIG. 6). If there is such identity, the OR circuit 820 generates the stall signal 622.

Similarly, if a memory access circuit determines a conflict of memory access, as discussed above in the context of FIG. 7, then the OR circuit generates the stall signal 725.

Figure 9:
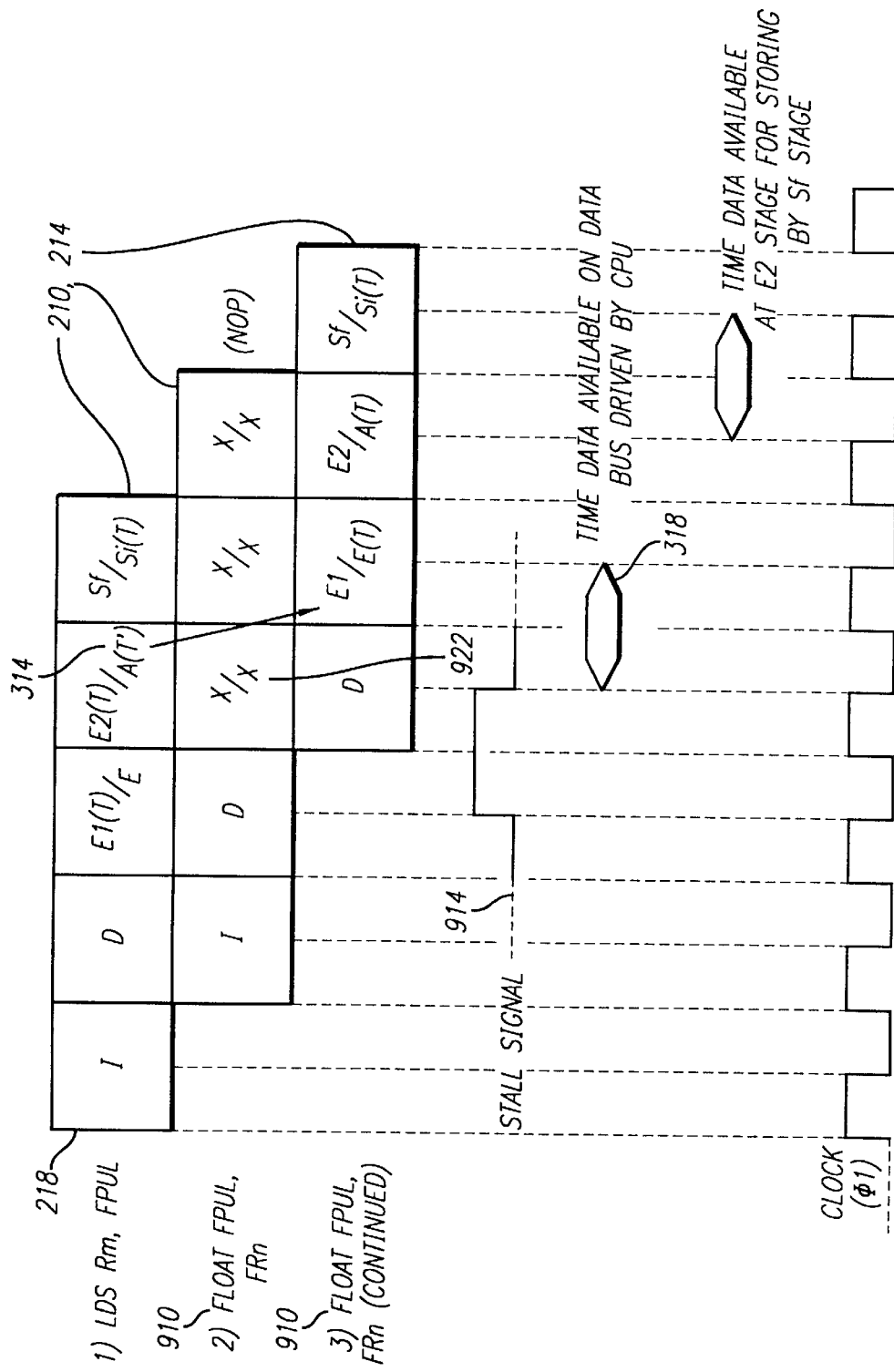
FIG. 9 illustrates how the CPU decode stage maintains synchronization by stalling both the FPU and the CPU pipelines, in accordance with a preferred embodiment of the invention.

FIG. 9 illustrates how the CPU decode stage 238 maintains synchronization by stalling both the FPU and the CPU pipelines 210, 214 substantially at the same time. In FIG. 9, two instructions are executed sequentially. First the CPU load to communication register instruction, discussed in FIG. 3(a), is fetched and executed by the FPU and CPU pipelines 210, 214. Next, the instruction fetch stage 218 fetches a float instruction 910. (The Instruction Fetch Unit I 218 fetches two instructions (thirty-two bits) at one time. This fetching occurs on an even word boundary. So it is not necessary to initiate a fetch cycle for every instruction.) As described on page A54 of the Appendix A, the float instruction 910 interprets the contents of the FPUL register as an integer value. The float instruction 910 further converts the integer value into a floating point number. Finally, the float instruction 910 stores the floating point number in a floating point register "FRn."

In FIG. 9, the float instruction 910 is stalled in the FPU and CPU pipelines 210, 214, as a consequence of the decode stage DI 238 of the CPU 118 applying a stall signal 914 to both execute stages 226 and 242. Consequently, the execution stages E1 226 and E 242 of both pipelines 210, 214 are stalled. Such a stall is commonly indicated by the letter "X". This stall is appropriate here, because when the float instruction 910 would normally be ready to execute, the A stage 246 of the CPU 118 has not yet made available the data on the data bus 122. Having been stalled for one cycle, the float instruction 910 continues once the stall signal 914 goes low. The data available at the output of the A stage 246 of the CPU pipeline 214 is bypassed via a bypass path 922 to the data bus 122 and from there to the input of the E1 stage 226 of the FPU pipeline 210. This bypass 922 avoids a need for an additional stall, because the float instruction 910 can begin executing by operating on the contents of the FPUL register available on the data bus 122.

Similarly, in this embodiment when a pipeline freeze occurs in one pipeline, it triggers substantially simultaneously a freeze of both pipelines, the FPU and the CPU pipelines 210, 214. During a pipeline freeze, all action in the pipelines 210 and 214 stops. A freeze of both pipelines 210, 214 happens, for example, as a result of a cache miss. A cache miss occurs when, for instance, the CPU 118 requests data that is not present in cache memory 146. In that case, the cache controller 142 sends the CPU 118 a signal that a cache miss has occurred. Also, when the IMAC 120 is not finished executing a multiplication the result of which a CPU instruction requires, then the IMAC 120 sends a busy signal to the CPU 118 as well as the FPU 114, thereby causing a pipeline freeze.

Figure 10:
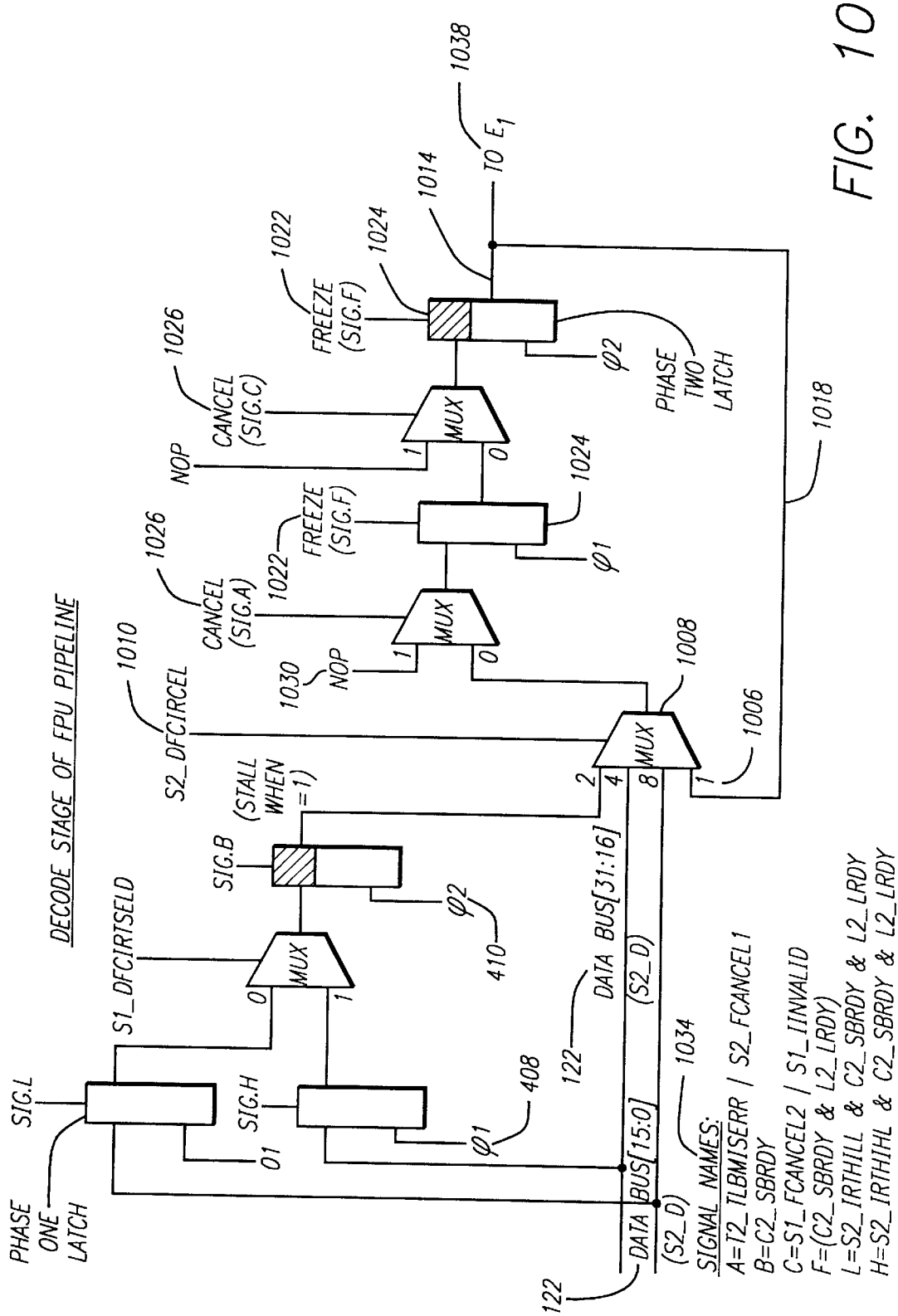
FIG. 10 is a diagram illustrating a decode stage of the FPU pipeline, in accordance with a preferred embodiment of the invention.

FIG. 10 is a circuit diagram of the decode stage Df 222 of the FPU pipeline 222. The function of the decode stage Df 222 depends on stall signal 1110 (see FIG. 11), which is generated by the decode stage Di 238 of the CPU 118. This stall signal 1110 is used in the execution stage E1 226 of the FPU pipeline 210 to introduce a NOP 1114 in the E1 stage 226. When the Df stage 222 detects a stall condition, the Df stage 222 of FIG. 10 re-circulates an instruction being decoded in Df 222 from a Df output 1014. Re-circulation via re-circulation path 1018 is achieved by a control signal 1010 from Di 238 selecting input 1006 (selector=1) of a multiplexer 1008.

FIG. 10 also shows the freeze signal selector paths 1022. As explained above, a freeze signal causes a pipeline to stop all execution in the entire pipeline. Similarly to the stall signal, a freeze signal is applied to both pipelines 210, 214, as explained above. The freeze signal 1022 disables the latches 1024. Also shown in FIG. 10 is a cancel signal selector path 1026. Applying a cancel signal at the cancel selector path 1026 cancels any instruction at that point in the pipeline by inserting a NOP 1030. Table 1034 further describes the signals applied to the decode stage 222 of the FPU pipeline 210. The explanation of symbolic signals (e.g. sig.A, sig.B, etc.) is in C-language notation. In table 1034, the vertical lines in the signal name definitions represent logical "OR'". The "&'s" represent logical AND's. The "~" represents a logical inversion. These signal names are listed with explanations in the Appendix A on pages A58 through A59.

Figure 11:
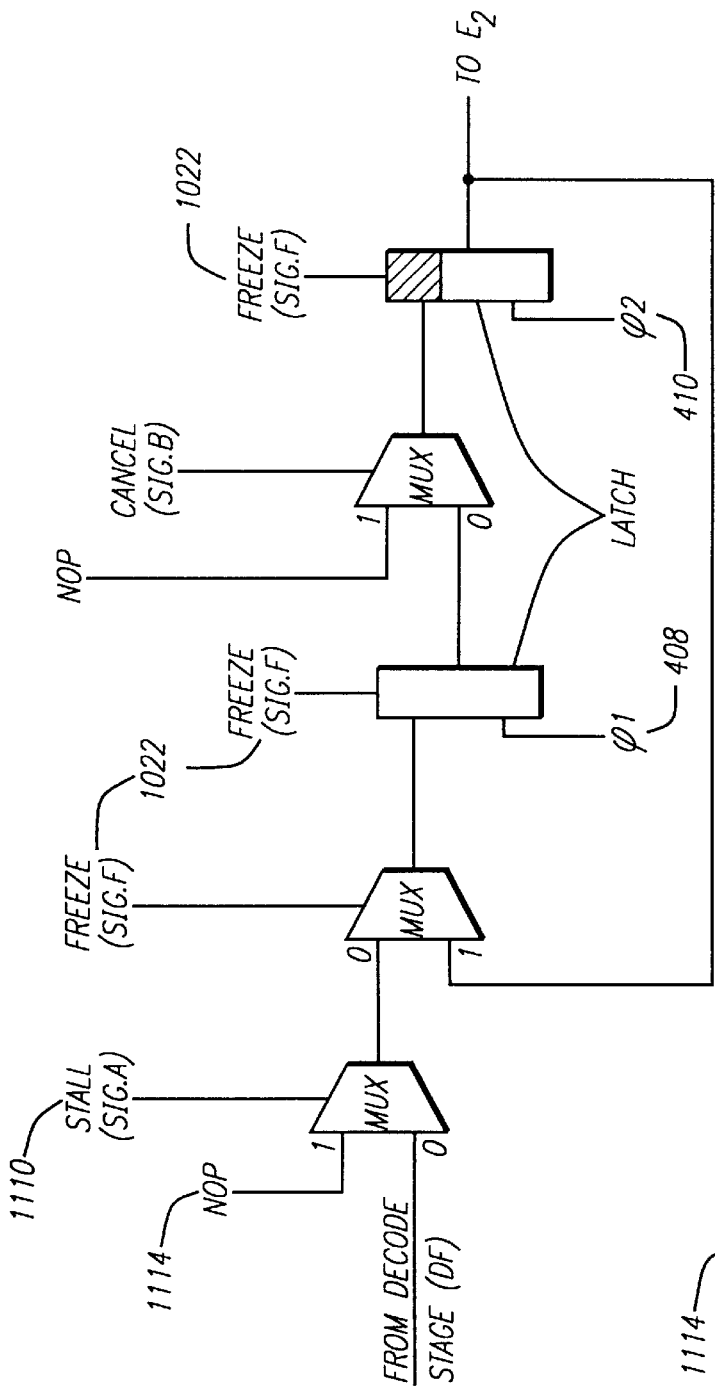
FIG. 11 is a diagram illustrating a first execution stage E1 of the FPU pipeline, in accordance with a preferred embodiment of the invention.

FIG. 11 shows a diagram of the first execution stage E1 226 of the FPU pipeline 210. When a stall is appropriate in the first execution stage 226, the decode stage 238 of the CPU 238 applies a stall signal at the stall signal path 1110, as described above. This prevents the output 1038 of the FPU decode stage 222 from being inserted into the E1 stage 226. Instead, assertion of the stall signal at path 1110 causes a NOP 1114 to be inserted into the E1 stage 226. The application of the freeze and cancel signals in FIG. 11 is similar to that of FIG. 10. The signals are explained in further detail in table 1114.

Figures 1, 12:
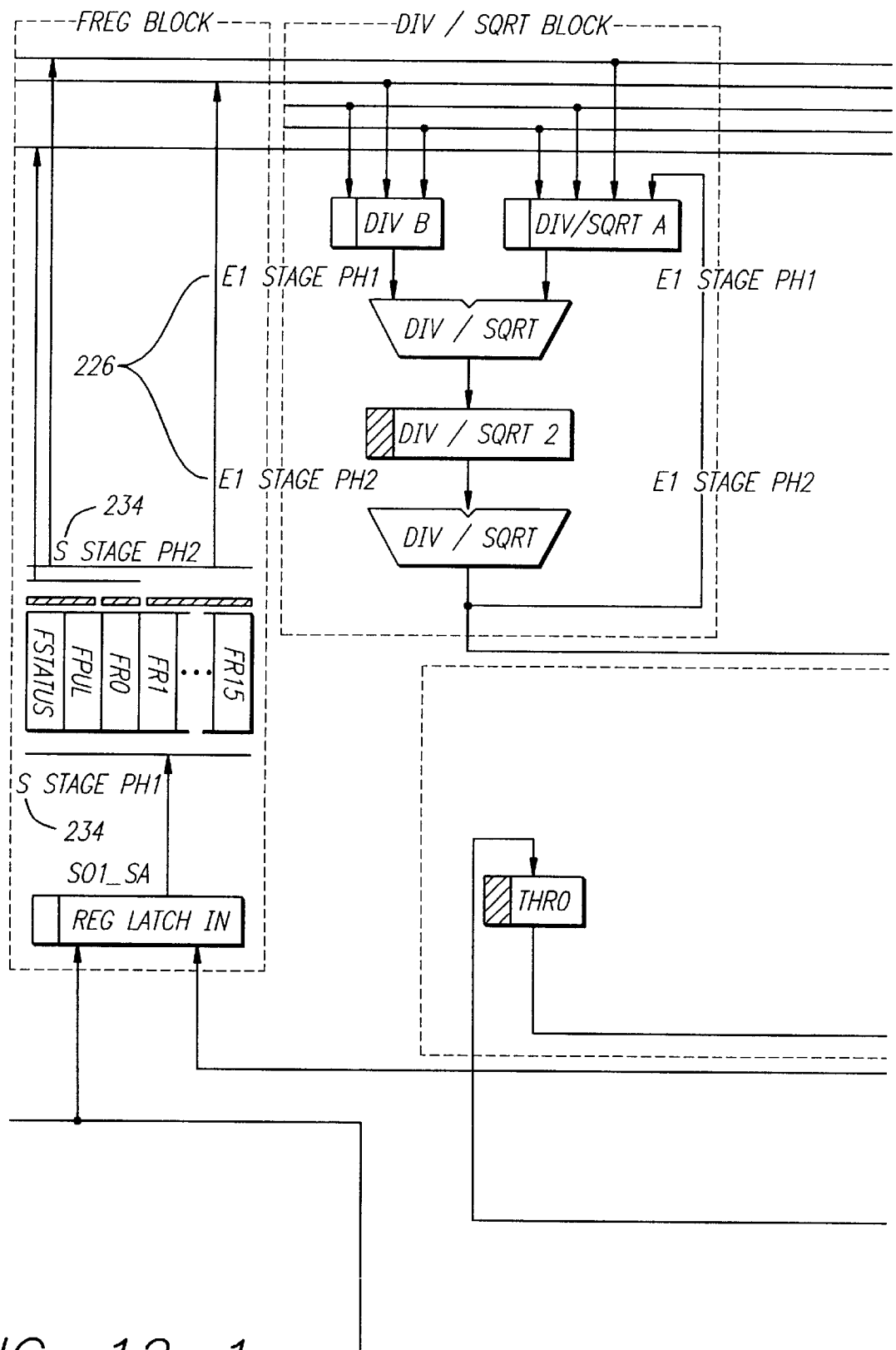
FIG. 12 is a detailed circuit diagram of the FPU pipeline, in accordance with a preferred embodiment of the invention.
Figures 2, 12:
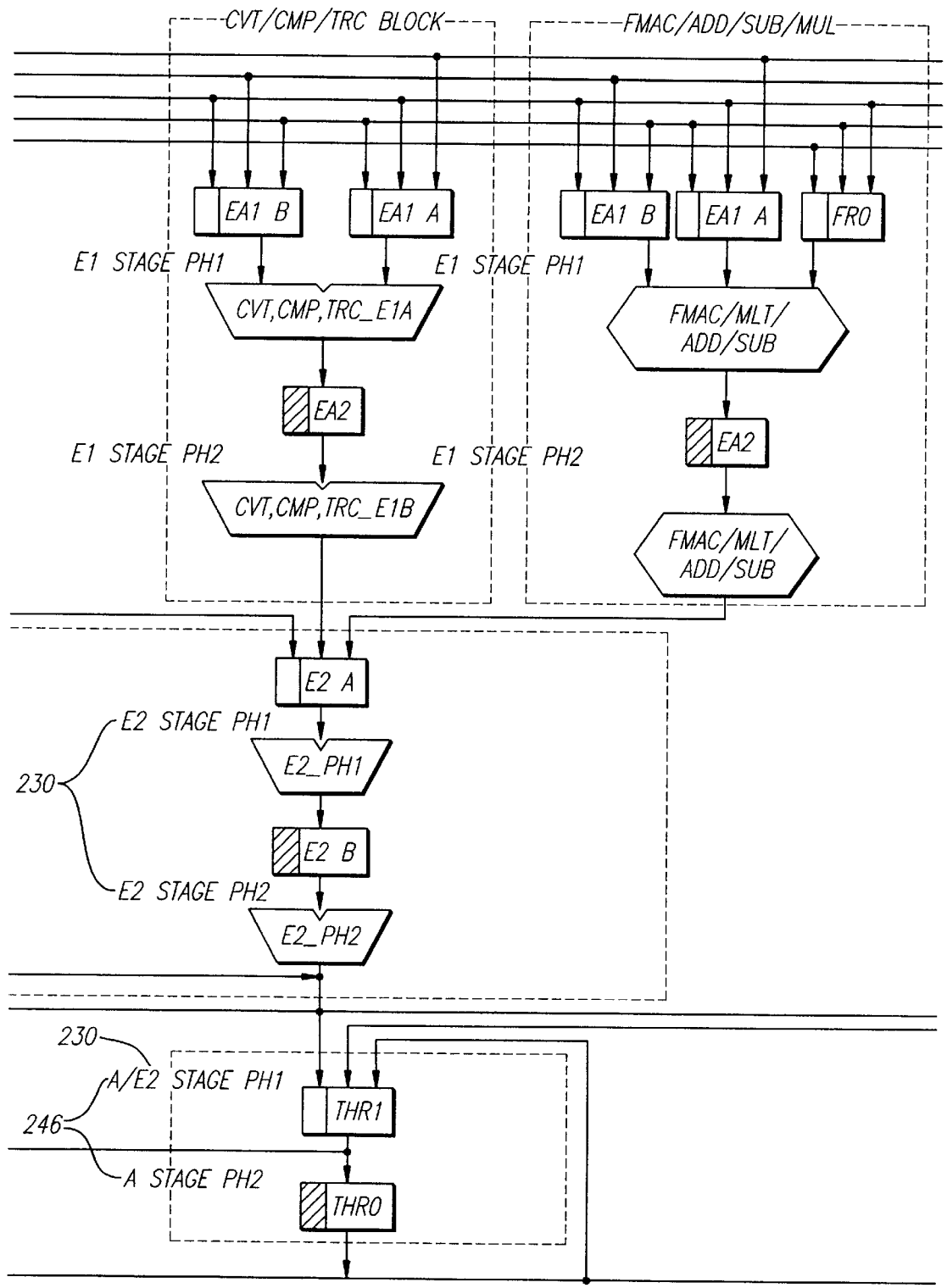
Figures 3, 12:
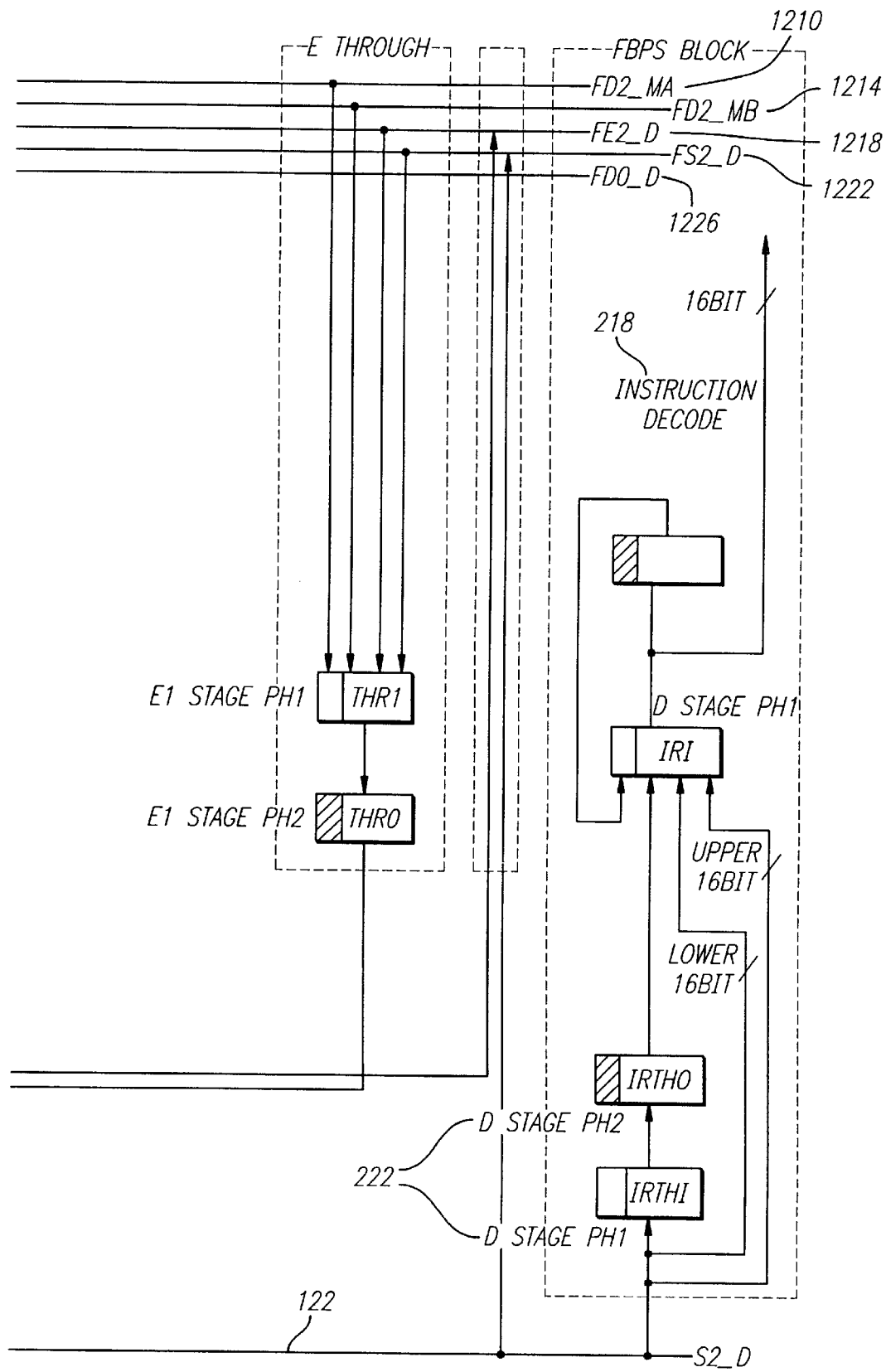

FIG. 12 is a detailed circuit diagram of stages Df 222, E1 226, E2 230, and Sf 234 of the FPU pipeline 210. The FPU pipeline circuit 1208 shows several inputs. Input 1210 is for a first operand and input 1214 is for a second operand of an FPU or CPU instruction. Input 1218 accepts a bypass data for re-circulating the output of the E2 stage 230 back to an input of the E1 stage. Input 1222 is for bypassing the contents of data bus (S2-D) 122 back to the input of the E1 stage 226. Input 1226 is an input from the FR0 register of a floating point register file. Latches indicated by hash marks are activated by phase two of the clock. Based on the above description and the descriptive names in FIG. 12, one of ordinary skill in the art will understand the remaining portions of circuit 1208.

Another type of instruction sequence that uses synchronization between the FPU and the CPU pipeline 210, 214, is the floating point compare instruction followed by a CPU branch instruction. FIG. 13 shows such a sequence. The floating point compare instruction 1310 sets a T-bit to a value of one when the contents of the floating point register FRm 1318 equal the contents of the floating point register FRn 1322 (see page A30 of the Appendix A). The value of the T-bit determines whether or not a jump to a branch target location is executed. The branch instruction 1314 is a CPU instruction. The branch instruction will cause fetching of a new instruction from a branch target in cache memory 146, if the T-bit is set to one. In FIG. 13, the value of the T-bit is bypassed from the E1 stage 226 of the FPU pipeline 210 to the E stage 242 of the CPU pipeline 214. Such bypassing (forwarding) of the T-bit avoids a stall in the execution of the CPU branch instruction 1314 that follows the floating point compare instruction 1310.

FIG. 14 illustrates a circuit for bypassing the T-bit from the E1 stage 226 to the E stage 242. In addition, the circuit of FIG. 14 has the capability of bypassing the T-bit between stages of the CPU pipeline 214. To illustrate the bypassing of FIG. 13, when the first instruction, i.e. the floating point compare instruction 1310, sets the value of the T-bit 1410 to one, then the FPU activates the T-bit select path 1414 to select via the multiplexer 1418 the T-bit 1410 from the E1 stage 226. The selection circuit 1422 selects from several possible T-bit sources, such as the A stage latches 1426 or the Si stage latches 1430 of the CPU pipeline 1414, or even from a status register 1434. A select signal 1432 is from the decoder Di 238 and is based on the instructions currently executing in the pipeline stages. The branch address generation circuit 1438 generates the address at which the CPU 118 can fetch the next instruction. (Of course, had the T-bit 1410 from the E1 stage 226 had a value of zero, then the branch address generation circuit 1438 would have selected the address of the instruction that immediately follows the branch instruction in the program order. The address of the next instruction 1442 is passed to the A stage 246 of the CPU pipeline 214 for fetching a target instruction.

Sometimes instructions cause exceptions. For example, an instruction may attempt to divide by zero or may attempt to use an improper operation code. When an exception occurs, an exception handler typically executes a series of instructions to handle the exception. Thereafter, the exception handler permits the CPU 118 to continue execution of the program with the instruction that caused the exception. In this embodiment exceptions are precise. Floating point instruction exceptions are detected in the E1 stage of 226 of the FPU pipeline 210. An exception is precise when the CPU 118 maintains original program order of a computer program, in spite of an exception. The original program order is the order of the original instruction sequence, i.e. as the computer program was compiled. In other words, when an exception is precise, instructions of a computer program are executed as if they were being executed by a purely sequential system, i.e., one that does not have pipeline capability. The exception handler saves the state of a machine, such as the state of the processor 110, prior to the time an exception occurred.

Figure 15:
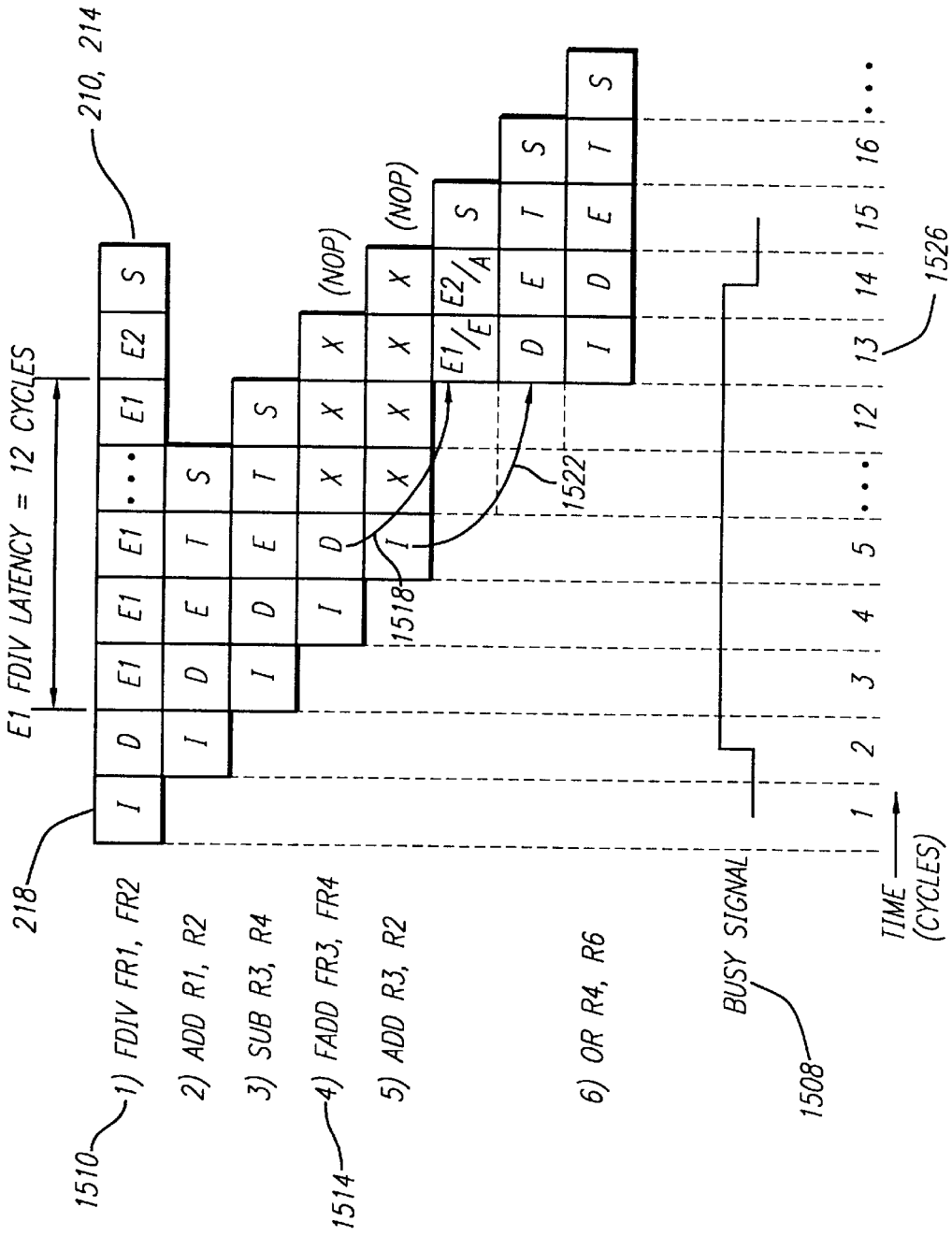
FIG. 15 illustrates the synchronization of the FPU and CPU pipelines for keeping exceptions precise, in accordance with a preferred embodiment of the invention.

Exceptions are made precise by having the same number of pipe stages in the CPU and the FPU pipelines 210, 214 as well as having common stalls and freezes of both pipelines 210, 214. To achieve synchronization of stalls and freezes in both pipelines 210, 214, additional circuitry is incorporated for long floating point instructions (e.g., floating point divide). FIG. 15 shows how, by asserting a busy signal, the decode stage 222 of the floating point pipeline 210 keeps exceptions precise even when a floating point instruction takes a relatively long time to complete. When the busy signal 124 is asserted (i.e., set high), no other floating point instruction can proceed beyond the Df stage 222 of the FPU pipeline 210 until the E1 stage 226 is freed up. While the busy signal 1508 is asserted, if another floating point instruction is fetched, this other instruction re-circulates in the Df stage 222). The CPU pipeline 214 also stalls.

In FIG. 15, each instruction is fetched by the I stage 218 in the sequence shown (1 to 6) and is executed by the FPU pipeline 210 or by the CPU pipeline 214. FIG. 15 illustrates a sequence of six instructions. The first instruction is a floating point divide instruction 1010. Once the decode stage Df 222 of the FPU pipeline 210 decodes the floating point instruction 1510, the Df stage 222 asserts the busy signal 1508. Following this assertion of the busy signal 1508 on the busy signal path 124, subsequent CPU instructions, such as instructions number two and three, can continue executing. However, the next FPU instruction, instruction number four, the floating point add instruction 1514, will cause the CPU pipeline 214 to stall by application of the stall signal 1110, as discussed above. The FPU pipeline stages E1 226, E2 230, Sf 234 continue with execution, but no instruction is allowed to move out of the Df stage. Once the first floating point instruction 1510 is finished being executed by the E1 stage 226, the Df 222 stage of the FPU pipeline 210 de-asserts the busy signal 1508. This permits the next floating point instruction, floating point add 1514, to propagate into the E1 stage 226.

Arrow 1518 indicates that the floating point add instruction proceeds into the E1 stage of the FPU pipeline 210 following the 12 cycles of execution in the E1 stage of the floating point divide instruction 1510. Similarly, arrow 1522 indicates that the fifth instruction, a CPU add instruction, proceeds into the decode stage DI 238 of the CPU pipeline 214 following the twelfth cycle in the E1 stage 226 of the floating point divide instruction 1510. So, should the floating point add instruction 1514 cause an exception in cycle thirteen 1526, the exception will be precise, because none of the instructions subsequent to the floating point add instruction 1514 have yet had a chance to execute.

Figure 16:
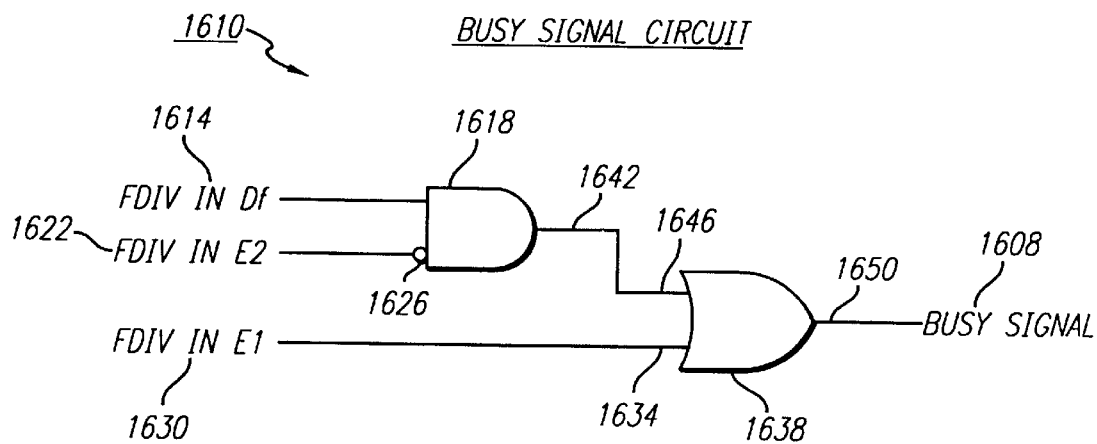
FIG. 16 shows a diagram of a busy signal circuit for asserting a busy signal on a busy signal path, in accordance with the embodiment of FIG. 15.
Figure 17:
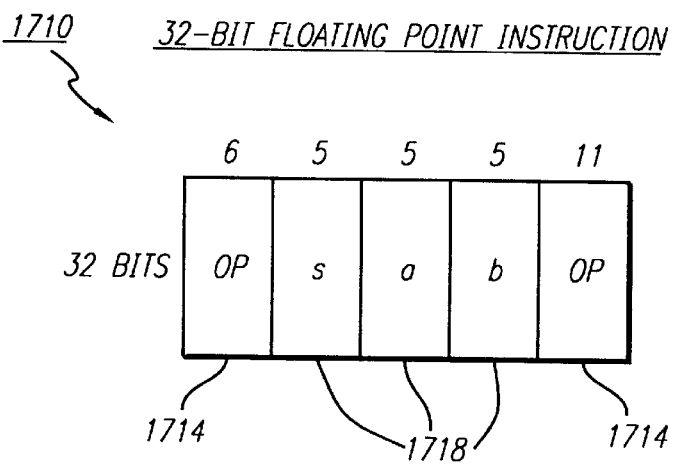
FIG. 17 illustrates a typical 32-bit length floating point instruction for the Power PC.

FIG. 16 shows a busy signal circuit for asserting the busy signal 1508 on busy signal path 124. In particular, a signal representative of the fact that a first instruction has entered the decode stage Df 222 of the FPU pipeline 210 is applied at a logical AND gate 1618. Further, the decode stage Df 222 applies a signal that it is representative of the fact that the first floating point instruction, in this case, the floating point divide instruction 1510, has entered the E2 stage. However, the signal is inverted by an inverter 1626 before it is processed by the logical AND gate 1618. Finally, a signal representative of the fact that the first floating point instruction has entered the E1 stage 226 is applied to an input 1634 of a logical OR 1638. Similarly, an output 1642 of the logical AND gate 1618 also is applied to another input 1646 of the logical OR gate 1638. The output 1650 of the logical OR gate 1638 provides the busy signal 1508 to the decode stage Di 238 of the CPU pipeline 214, so that it can cause a stall in the CPU pipeline 214 and re-circulate the instruction in the Df stage 222 of the FPU pipeline 210.

Patent application Ser. No. 08/594,750, entitled "Microprocessor Including Floating Point Unit With 16-bit Fixed Length Instruction Set" by the inventors Prasenjit Biswas, Shumpei Kawasaki, Norio Nakagawa, Osamu Nishii, and Kunio Uchiyama is provided below.

Another embodiment of this invention is a 32-bit RISC architecture with a 16-bit fixed length floating point instruction set. Reducing the floating point instruction length to only sixteen bits saves memory space for storage of a computer program. For example, reducing the floating point instruction length from thirty-two bits to sixteen bits cuts the memory required for storing these instructions by half. Reducing instruction size reduces the cache miss rate, because more instructions can be stored in the cache memory. Furthermore, reducing the floating point instruction length improves the instruction fetch latency. Fetch latency refers to the time required to fetch an instruction from memory. The 16-bit instructions are fetched in 32-bit blocks. Consequently, a single fetch from memory can obtain two instructions, whereas for 32-bit instructions it is possible to fetch only one instruction per memory sequence. Reducing the floating point instruction length can also reduce the size of the memory required for storing the floating point instructions, thus reducing the die area used for on-chip cache memory.

This embodiment is particularly advantageous for embedded applications (e.g. video games) that have a need for efficient support for three dimensional graphics. Generally, data representation for single precision floating point conforms to the IEEE floating point standard. However, for efficiency, this embodiment does not support all exceptions of the IEEE floating point standard. Also, all of the IEEE rounding modes are not supported. Similarly, if the result of a value generating floating point operation is a denormalized number, it is flushed to zero. All these above deviations from the IEEE floating point standard save die area and execution cycle time. The precise details of the deviations from the IEEE floating point standard are shown in the Appendix A (see pages A27–A28.) The above, is discussed in additional detail further below.

Figure 18:
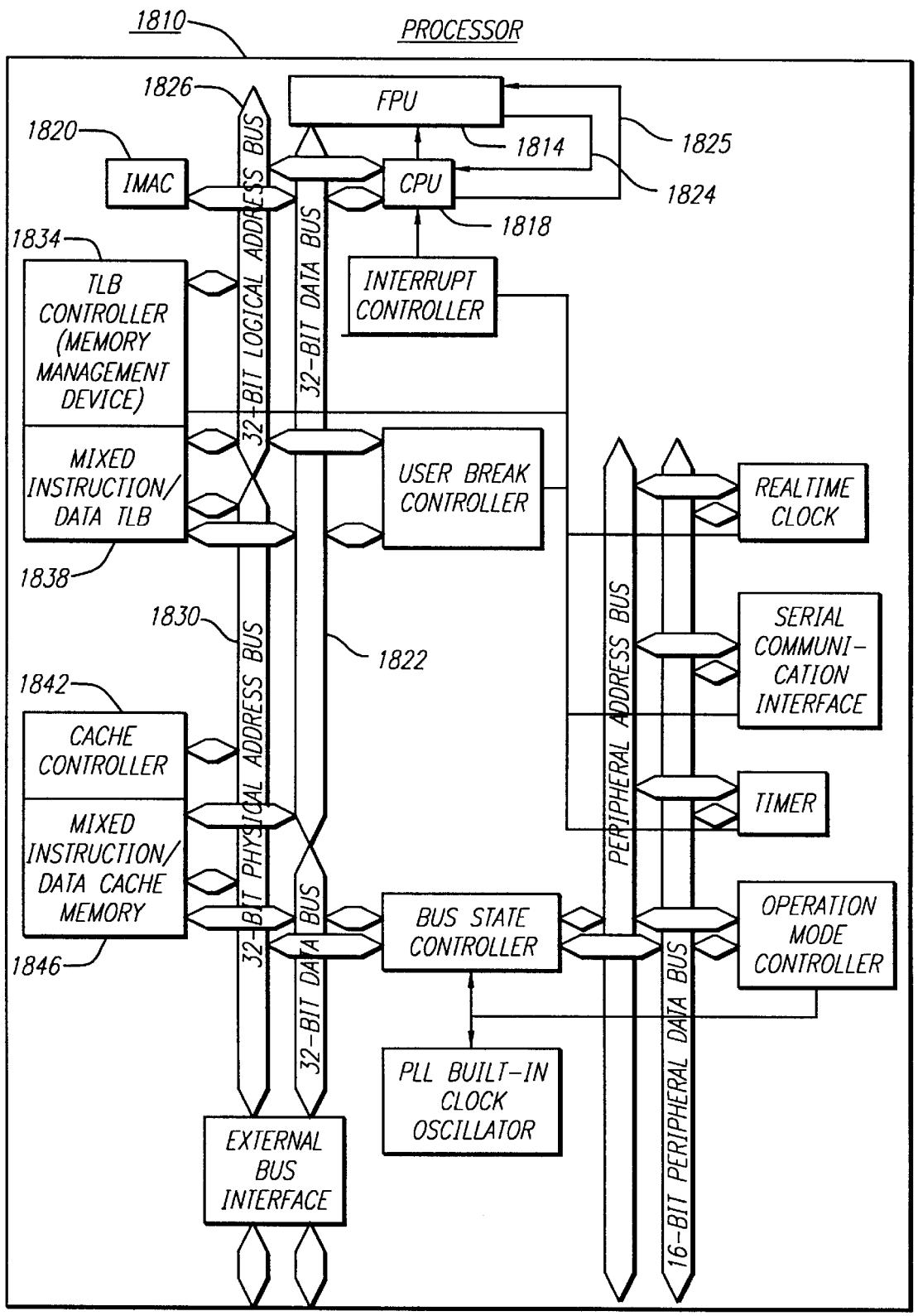
FIG. 18 is a diagram illustrating a circuit for a processor including a Floating Point Unit (FPU), in accordance with a preferred embodiment of the invention.

FIG. 18 shows a diagram for a processor of this embodiment of the present invention. Processor 1810 has a Floating Point Unit (FPU) 1814. In addition, the processor 1810 has a Central Processing Unit (CPU) 1818, which has the capability of operating on integers. Details and advantages of using fixed length 16-bit instructions for the CPU 1818 have been discussed in the Article "SH3: High Code Density, Low Power", IEEE Micro, pp. 11–19, December 1995, which is hereby incorporated by reference. The CPU 1818 is coupled to the FPU 1814 via a 32-bit data bus 1822. An Integer Multiplication and Accumulation Unit (IMAC) 1820 is coupled to the data bus 1822. Interface signals between the circuits of FIG. 18 are not shown except for the interface signals 1824 and 1825 between the CPU 1818 and the FPU 1814. The CPU 1818 is coupled via a 32-bit logical address bus 1826 to a memory management device 1834 (TLB controller). TLB stands for Translation Look Ahead Buffer. The TLB controller 1834 controls a mixed instruction/data TLB 1838. The TLB 1838 is coupled via a 32-bit physical address bus 1830 to a cache controller 1842. The cache controller 1842 controls a mixed instruction/data cache memory 1846. The cache memory 1846 is coupled via the 32-bit data bus 1822 to the CPU 1818 and the FPU 1814. Based on this description and descriptive names in FIG. 18, the functions of additional circuits illustrated in FIG. 18 are self-explanatory to one of ordinary skill in the art.

The function of the processor 1810 can be understood by the following example. The FPU 1814 may require data or an instruction from memory for a floating point operation. In this embodiment, the FPU 1814 does not have the capability of addressing memory to retrieve data from or store data in cache memory 1846. This saves die area by obviating the need for FPU memory addressing circuitry. Instead, the CPU 1818 addresses the cache memory in place of the FPU 1814. Not only does the CPU 1818 initiates fetching of data from memory for the FPU 1814, the CPU 1818 also fetches from memory all instructions including floating point instructions for the FPU 1814. Furthermore, as explained in greater detail below, data transfers between the FPU 1814 and the CPU 1818 are conducted without memory access but instead through faster register access.

To obtain data or an instruction, the CPU 1818 requests data or instructions from memory 1846 by computing and sending a logical (i.e., virtual) address to the memory management device 1834 via the 32-bit logical address bus 1826. If the corresponding physical address is not already stored in the TLB 1838, then a TLB miss occurs and the TLB controller 1834 initiates a program sequence to convert (translate) the logical address into a physical address using additional mapping information. The memory management device 1834 then stores the physical address in the TLB 1838. The TLB 1838 stores the address for future use, when the CPU 1818 again may request data at the same address range. TLB 1838 sends the physical address via the 32-bit physical address bus 1830 to the cache controller 1842. The cache controller 1842 instructs the mixed instruction/data cache memory 1846 to place the data or instruction on the 32-bit data bus 1822. If the requested address is not available in the cache memory 1846, a cache miss occurs and CPU 1818 and FPU 1814 processing is frozen by application of a cache miss signal (c2_sbrdy [see Appendix A] until the required information is fetched to the cache from external memory. An instruction is picked up for decoding by both the CPU 1818 and the FPU 1814. Instruction data is available on a common 32-bit data bus shared by the CPU 1818 and the FPU 1814. The FPU 1814 preferably does not have the capability of initiating memory addressing for data and/or instruction fetch.

The floating point data that the CPU 1818 fetches from cache memory 1846 is stored in standard IEEE single precision format. However, in this design, as mentioned earlier, the IEEE floating point standard is not strictly adhered to. These deviations are to reduce the die area and to reduce the number of needed execution cycles of the processor 1810. These deviations are acceptable compromises in embedded applications. For example, denormalized floating point numbers are flushed to zero (i.e., set to zero) by value-generating floating point operations. A denormalized floating point number has a biased exponent of zero value. Examples of value-generating floating point operations are floating point addition, subtraction, multiplication, and division. However, a non-value-generating floating point operation, such as a copy instruction, does not flush to zero a denormalized floating point number.

Figure 19:
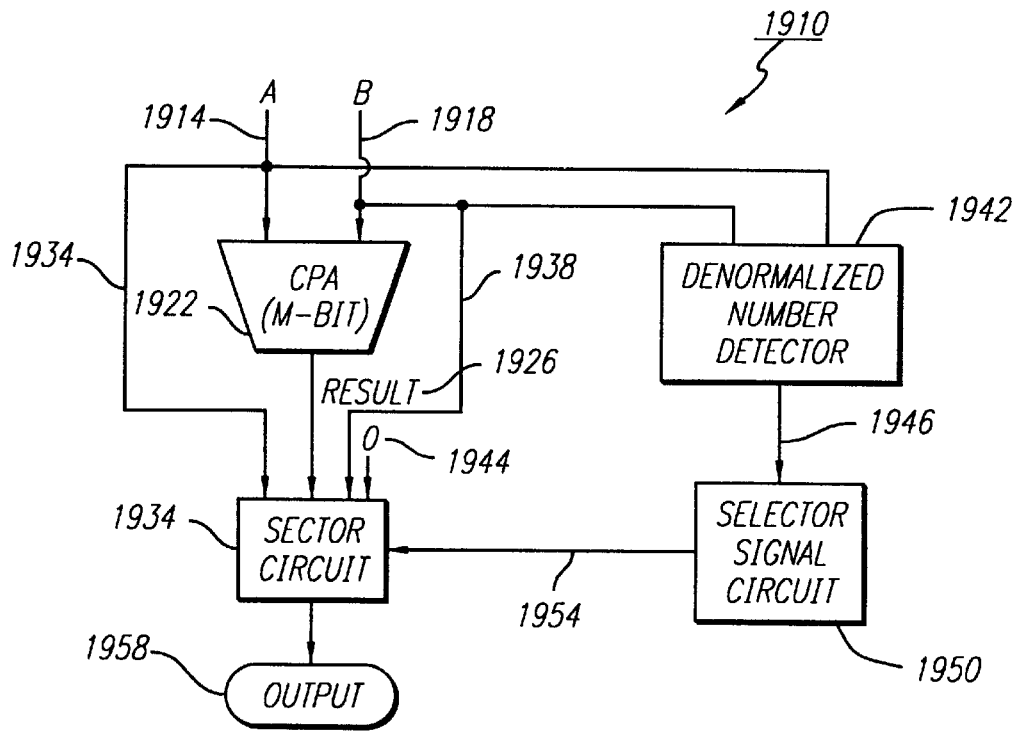
FIG. 19 is a diagram illustrating a circuit for flushing denormalized floating point numbers to zero, in accordance with a preferred embodiment of the invention.

A circuit 1910 for flushing denormalized numbers to zero is shown in FIG. 19. The circuit 1910 has floating point number inputs 1914, 1918 to a carry propagation adder (CPA) 1922. The adder 1922 can add the floating point numbers A and B to provide a result 1926 to a selector circuit 1930. Data paths 1934 and 1938 couple inputs 1914, 1918, respectively, directly to the selector 1930. Inputs 1914 and 1918 also are connected to a denormalized number detector 1942. Also connected to the selector circuit 1930 is an input for a floating point number of value zero 1944. Signal path 1946 connects the denormalized number detector 1942 with a selector signal circuit 1950. Selector signal path 1954 couples selector signal circuit 1950 to the selector circuit 1930. The selector 1930 can provide an output 1958.

The circuit 1910 flushes denormalized numbers to zero as follows. The denormalized number detector 1942 detects whether either one of floating point numbers A or B is a denormalized number. The denormalized number detector 1942 passes this information via signal path 1946 to the selector signal circuit 1950. If either one of the floating point numbers A or B is a denormalized number, then the selector signal circuit 1950 controls the selector circuit 1930 via selector path 1954 to select directly the non-denormalized number 1914 or 1918. If neither of the floating point numbers A, B is a denormalized number, then the selector signal circuit 1950 controls the selector circuit 1930 to select the result 1926 for the output 1958 of the selector circuit 1930.

However, if both floating point numbers A and B are denormalized numbers, then the selector signal circuit 1950 controls the selector circuit 1930 to select the zero 1944 for the output 1958 of the selector circuit 1930.

Based on this description, one of ordinary skill in the art will understand how to modify circuit 1910 to handle denormalized floating point numbers A and/or B for other floating point operations. For instance, clearly, the adder 1922 could also be used for a subtraction of floating point numbers A and B from each other. Similarly, in place of the adder 1922, a multiplier could multiply floating point numbers A and B. However, in the case of a multiplication, the selector signal circuit 1950 would control the selector circuit 1930 to select the zero value 1940, even if only one of the floating point numbers A or B were a denormalized number.

Also, one of ordinary skill in the art will realize, based on the above description, that if the adder 1922 were replaced with a divider, then the selector signal circuit 1950 would control the selector 1930 to select either the zero value 1944 or an infinity representation of a floating point number. The particular selection would depend on which of the floating point numbers A or B is a denormalized number. (See divide by zero exception on page A29 of the Appendix A.) The case of a divider replacing the adder 1922 and both floating point numbers A and B being denormalized numbers is an example of an invalid operation (see page A29 of Appendix A).

As mentioned above, to further simplify hardware complexity of the FPU 1814, floating point numbers are rounded to zero, i.e., truncated. Not only is hardware complexity reduced by rounding to zero, but in addition, clock cycles are saved.

FIG. 30 shows the circuit 3008 for rounding floating point numbers to zero. In FIG. 30, the contents of registers FRm 3010 and FRn 3014 are operated on. Both contents 3010, 3014 are floating point numbers. A normalizer 3018 normalizes the floating point numbers 3010 and 3014, as for example, may be required in an addition of these two numbers 3010 and 3014. When the floating point operation on the floating point numbers 3010 and 3014 is, for example, an addition, an adder 3022, such as a 2-m-bit CPA, adds the floating point numbers 3010 and 3014.

Of course, instead of an addition, the operation performed by the adder 3022 could be a subtraction. The output 3024 of the adder 3022 is input into a leading one detector and normalizer circuit 3025. A 2-m bit result of circuit 3025 is coupled to an intermediate register 3026. The least significant m-bits 3030 of the intermediate register 3026 are ignored. Whereas, the m most significant bits 3046 in the register 3026 are passed on to the rounded result 3050. So, as the result of the operation of circuit 3008, the m least significant bits of the result of a floating point operation on the numbers 3010 and 3014 are set to zero.

While circuit 3008 adds floating point numbers 3010 and 3014, another circuit may multiply or divide floating point numbers 3010, 3014 by each other. Based on the above description of circuit 3008, it will be clear to one of ordinary skill in the art that instead of the addition of floating point numbers as shown in circuit 3008, another circuit can divide or multiply floating point numbers 3010 and 3014. However, to achieve the rounded result 3050, the portion 3054 of circuit 3008 would not need to be changed. The portion 3054 can take any other output in place of adder output 3024 and set the least significant m-bits 3030 to zero.

A complete list of the floating point instructions and of the CPU instructions related to the floating point instructions is shown below in Tables 1 and 2. These instructions are described in detail in the Appendix A on pages A32–A58 and include C language descriptions of the instruction. These instructions, as listed in the Appendix A, show underlines that have no significance regarding the meaning of the instructions.

TABLE 1

Floating Point Instructions

| operation | op code | mnemonic |
| --- | --- | --- |
| Floating Move (Load) | FNM8 | FMOV.S @ Rm, FRn |
| Floating Move (Store) | FNMA | FMOV.S FRm, @ Rn |
| Floating Move (Restore) | FNM9 | FMOV.S @ Rm+, FRn |
| Floating Move (Save) | FNMB | FMOV.S FRm, @ –Rn |
| Floating Move (Load with index) | FNM6 | FMOV.S @ (R0. Rm), FRn |
| Floating Move (Store with index) | FNM7 | FMOV.S FRm, @ (R0. Rn) |
| Floating Move (in register file) | FNMC | FMOV FRm, FRn |
| Floating Load Immediate 0 | FN8D | FLDI0 FRn |
| Floating Load Immediate 1 | FN9D | FLDI1 FRn |
| Floating Add | FNM0 | FADD FRm, FRn |
| Floating Subtract | FNM1 | FSUB FRm, FRn |
| Floating Multiply | FNM2 | FMUL FRm, FRn |
| Floating Divide | FNM3 | FDIV FRm, FRn |
| Floating Multiply Accumulate | FNME | FMAC FR0, FRm, FRn |
| Floating Compare Equal | FNM4 | FCMP/EQ FRm, FRn |
| Floating Compare Greater Than | FNM5 | FCMP/GT FRm, FRn |
| Floating Test NaN | FN7D | FTST/NAN FRn |
| Floating Negate | FN4D | FNEG FRn |
| Floating Absolute Value | FN5D | FABS FRn |
| Floating Square Root | FN6D | FSQRT FRn |
| Floating Convert from Integer | FN2D | FLOAT FPUL, FRn |
| Floating Truncate and Convert to Integer | FN3D | FTRC FRm, FPUL |
| Floating Store from System Register FPUL | FN0D | FSTS FPUL, FRn |
| Floating Load to System Register FPUL | FN1D | FLDS FRm, FPUL |

TABLE 2

CPU Instructions Related to FPU

| operation | op code | mnemonic |
| --- | --- | --- |
| Load from System Register FPUL | 4N5A | LDS Rm FPUL |
| Restore System Register FPUL | 4N56 | LDS.L @ Rm+, FPUL |
| Load from System Register FPSCR | 4N6A | LDS Rm, FPSCR |
| Restore System Register FPSCR | 4N66 | LDS.L @ Rm+, FPSCR |
| Store to System Register FPUL | 0N5A | STS FPUL, Rn |
| Save System Register FPUL | 4N52 | STS.L FPUL, @ –Rn |
| Save to System Register FPSCR | 0N6A | STS FPSCR, Rn |
| Save System Register FPSCR | 4N62 | STS.L FPSCR, @ –Rn |

Figure 20:
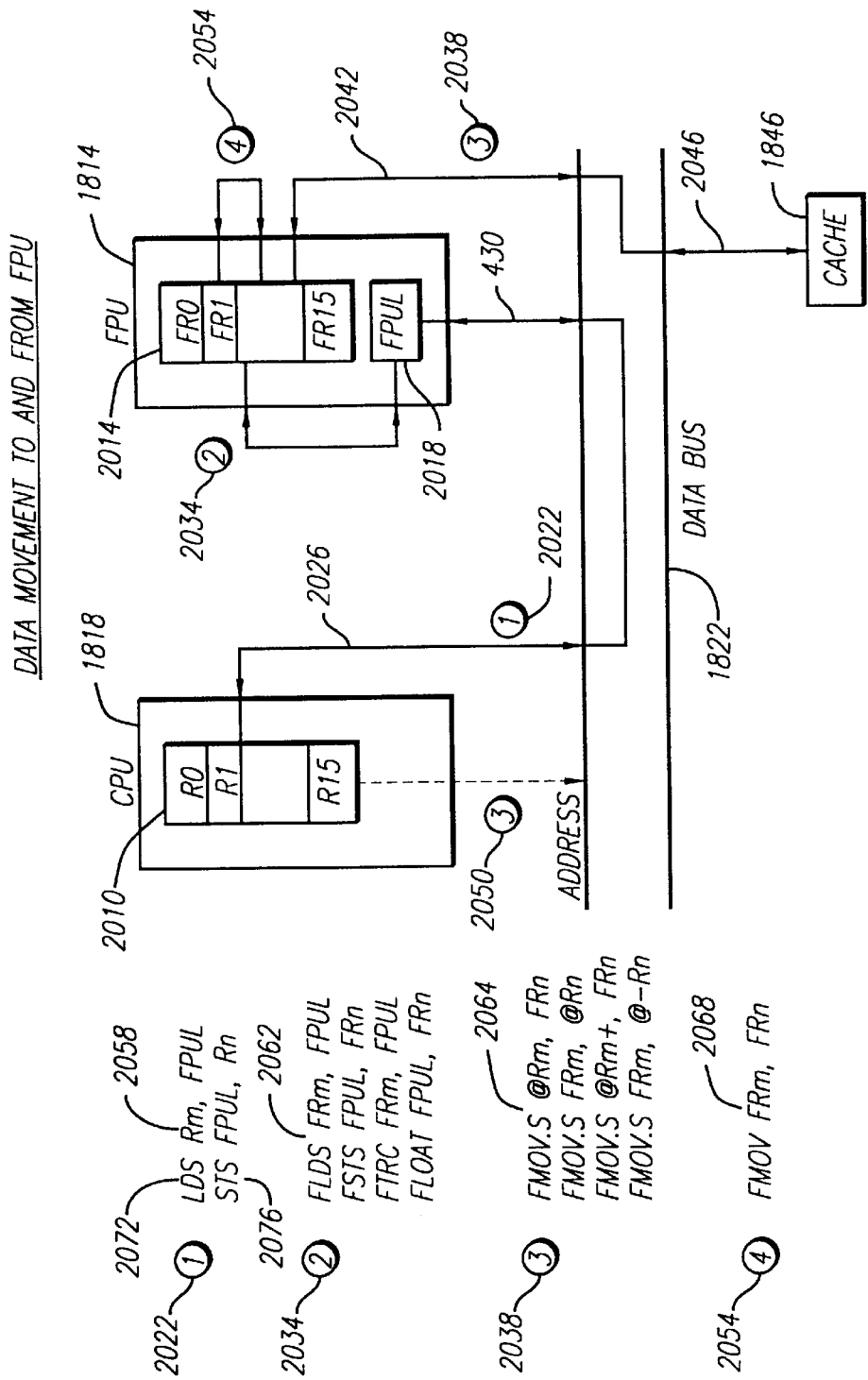
FIG. 20 is a block diagram of a circuit for moving data to and from the FPU, in accordance with a preferred embodiment of the invention.

Any exchange of data between the CPU 1818 and the FPU 1814 occurs via a dedicated communication register FPUL 2018 (see FIG. 20). As discussed above, typically in other RISC processors data exchange between the CPU 1818 and the FPU 1814 occur via a transfer through memory, such as cache memory 1846. Transfer via cache 1846 is relatively slow compared to transfer via registers, such as the FPUL register 2018.

FIG. 20 shows a block diagram of the circuit for moving data to and from the FPU 1814. Such movement of data includes not only transfer of data between the CPU 1818 and the FPU 1814, but also includes the mechanism for the FPU 1814 to indirectly access the cache memory 1846 for data fetch. In FIG. 20, the CPU 1818 has a register file 2010, i.e., registers that range from R0 to R15. Similarly, the FPU 1814 has a register file 2014 with registers ranging from FR0 to FR15. In addition, the FPU 1814 has the communication register FPUL 2018. The CPU 1818 is coupled to the FPU 1814 via data path one 2022. Path one 2022 includes segment 2026 that couples the CPU 1818 to the data bus 1822. Path one 2022 also includes segment 2030 that couples the data bus 1822 to the FPUL 2018. Register file 2014 of the FPU 1814 is coupled to the communication register FPUL 2018 via data path two 2034. The FPU registers 2014 also are coupled via data path three 2038 to cache memory 1846. Path three includes path segment 2042 which couples the FPU registers 2014 to the data bus 1822. Path three also includes segment 2046 which couples the data bus 1822 to the cache 1846. In addition, path three has an address link 2050 associated with it. The address link 2050 couples the CPU 1818 to the data bus 1822 for addressing purposes. Finally, data path four 2054 couples the FPU data registers 2014 to each other. Additional details about the CPU general purposes registers 2010 and about the floating point registers 2014 are described in the Appendix A on pages A14–A17.

There are certain CPU or FPU instruction groups that are used for data transfer along particular data paths. Data paths one, two, three, four 2022, 2034, 2038 and 2054 are associated with instruction groups 2058, 2062, 2064, and 2068, respectively.

Figure 21:
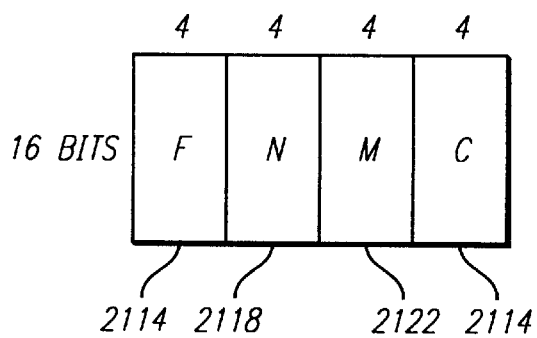
FIG. 21 illustrates a 16-bit floating point instruction, in accordance with a preferred embodiment of the invention.

FIG. 21 illustrates one of the floating point instructions of Table 1, a 16-bit floating point instruction 2068, in particular the floating point instruction associated with path four 2054. The instruction 2068 moves the contents of floating point register FRm to the floating point register FRn, as shown in the assembler code (mnemonic column of Table 1) and as explained on page A57 of the Appendix A, where "m" and "n" may assume values 0–15. This move instruction 2068 has four parts, each with a length four bits. Two parts of the floating point move instruction 2068 make up the operation code 2114. (See op code column of Table 1.) The other two parts 2118 and 2122, shown in hexadecimal form in FIG. 21

(and in the op code column of Table 1) denote operands, i.e., register identifiers FRn and FRm, respectively. The operation code 2114 operates with the registers identified by 2118 and 2122 to accomplish the floating point move.

To illustrate another instruction associated with a data path and to illustrate the operation of the circuit of FIG. 20, the following explains the CPU load to communication register instruction 2072 of the instruction group 2058 associated with data path one 2022. The instruction "LDS Rm, FPUL" CPU load to communication register instruction 2072 copies the contents of the general purpose CPU register Rm to the floating point communication register FPUL 2018, as explained on page A52 of the Appendix A. To execute the CPU load to communication register instruction 2072, the CPU transfers the contents of register Rm to the data bus 1822. In the register designation "Rm," the index "m" can range from 0–15 to identify any of the general purpose registers 2010 of the CPU 1818. The CPU 1818 then makes available the data on the data bus 1822 for a sufficient period of time, such that the data may be transferred from the data bus 2030 and stored by the FPU 1814 in the FPUL register 2018.

Figure 22:
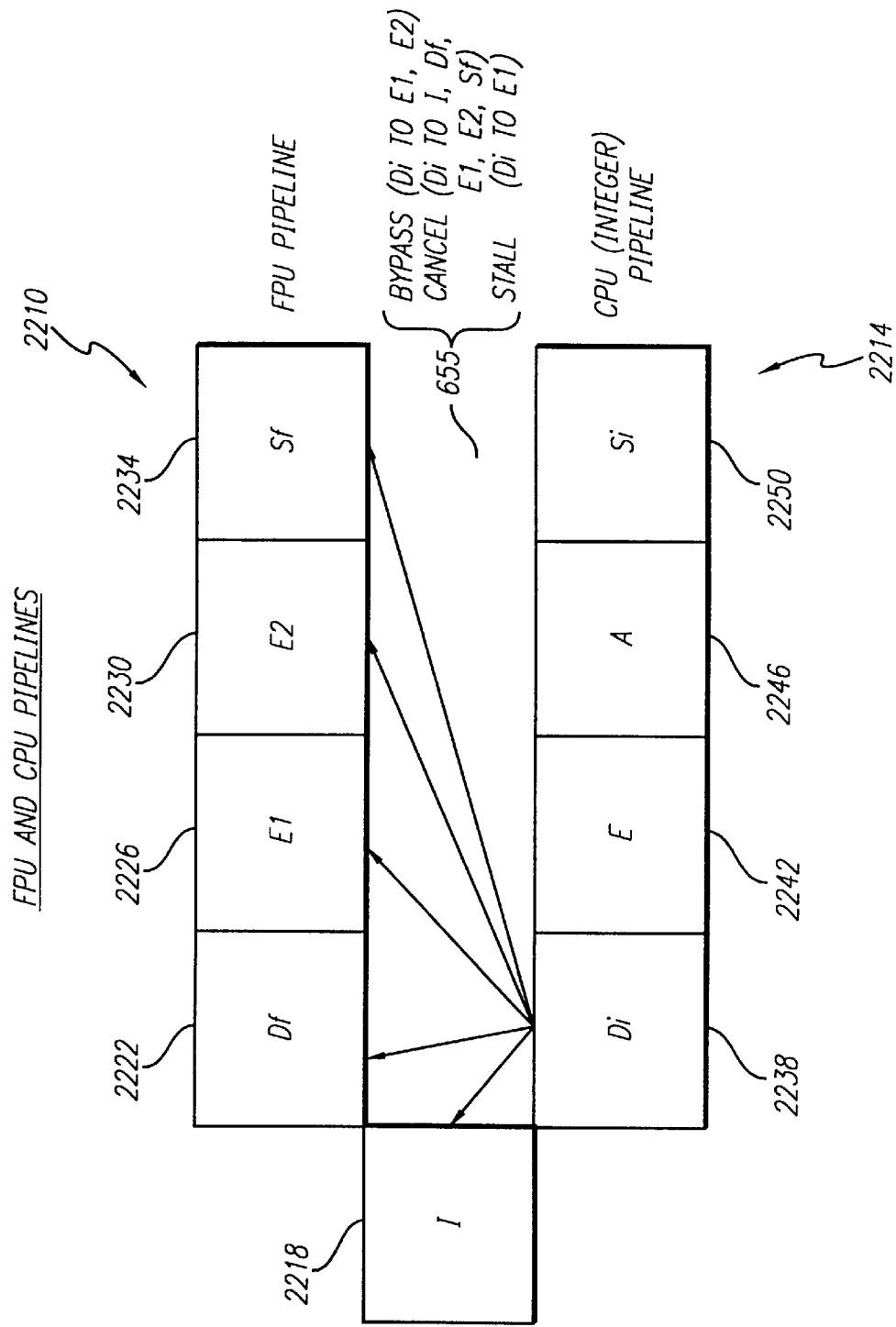
FIG. 22 illustrates pipelines of the FPU and the CPU, in accordance with a preferred embodiment of the invention.

FIG. 22 illustrates the pipelines that the FPU 1814 and the CPU 1818 use to execute instructions. The FPU pipeline 610 and the CPU pipeline 2214 share a single instruction fetch stage 2218. In addition, the FPU pipeline 2210 has four more stages: a decode stage Df 2222, a first execution stage E1 2226, a second execution stage E2 2230, and a write back stage Sf 2234. Similarly, the CPU pipeline 2214 has four additional stages: a decode stage Di 2238, an execution stage E 2242, a memory access stage A 2246, and a write back stage Si 2250. The Di stage 2238 generates the signals for bypass, stall, and cancel for the FPU pipeline stages, as shown in FIG. 22 by the arrows 2255. The Di stage 2238 provides, via signal paths 2255, bypass signals to the E1 and E2 stages 2226, 2230, cancel signals to the FPU stages 2222, 2226, 2230, 2234, including the shared I stage 2218, and stall related signals to the Df stage 2222 and a stall signal to the E1 stage 2226. These signals are further explained below.

An instruction available on the data bus 1822 is initially retrieved by the instruction fetch stage 2218. From the instruction fetch stage 2218, both decode stages Df 2222 and Di 2238 decode the fetched instruction. The first phase of decode stage involves identifying whether an instruction is a CPU or FPU instruction. An FPU instruction is identified by an F (Hex) in the high order four bits of the instruction. If an instruction is not of floating point type, the Df stage 2222 does not decode the instruction any further. Similarly, the Di stage 2238 does not completely decode a floating point instruction. The Di stage 2238 does not decode a floating point instruction to identify the floating point function to be performed. This results in significant reduction in hardware complexity. If only a single decode stage were used, all signals required to control an FPU data path would have to cross over from the CPU 1818 to the FPU 1814 causing an increase in die area. When the fetched instruction is a floating point instruction, the E1 stage 2226 of the FPU pipeline 2210 begins executing the instruction. The E2 stage 2230 of the FPU pipeline 2210, then completes the execution of this floating point instruction. Depending on the requirements of the instruction, the Sf stage 2234 of the FPU pipeline 2210 can store the result of the instruction in a floating point register.

Similarly, for the case when the fetched instruction is a CPU instruction, such as an instruction for operating on integers, the E 2242 stage of the CPU pipeline 2214 executes the instruction. The A stage 2246 of the CPU pipeline 2214 accesses cache memory 1846, when called for by the particular instruction being executed. Finally, the Si stage 2250 of the CPU pipeline 2214 can write the result of the instruction into, for example, one of the CPU registers 2010. Instructions that require only the use of one of the two pipelines, FPU 2210 or CPU 2214 pipeline, result in the instructions simply being pushed through the pipeline that is not being used. For example, when the instruction fetch stage 2218 fetches an integer addition, the CPU pipeline CPU 2214 executes this integer addition in the execution stage 2242 and then stores the results in a register in the Si stage 2250. However, having decoded the integer add instruction, the Df stage 2222 of the FPU pipeline 2210 pushes the integer add instruction through the E1 stage 2226. The integer add instruction continues being pushed through the remaining stages of the FPU pipeline 2210 during subsequent clock cycles. Similarly, when the fetched instruction is a pure floating point instruction, the Di stage 2238 pushes the floating point instruction through the E stage 2242 and during subsequent cycles through the remaining stages of the CPU pipeline 2214.

Figure 23A:
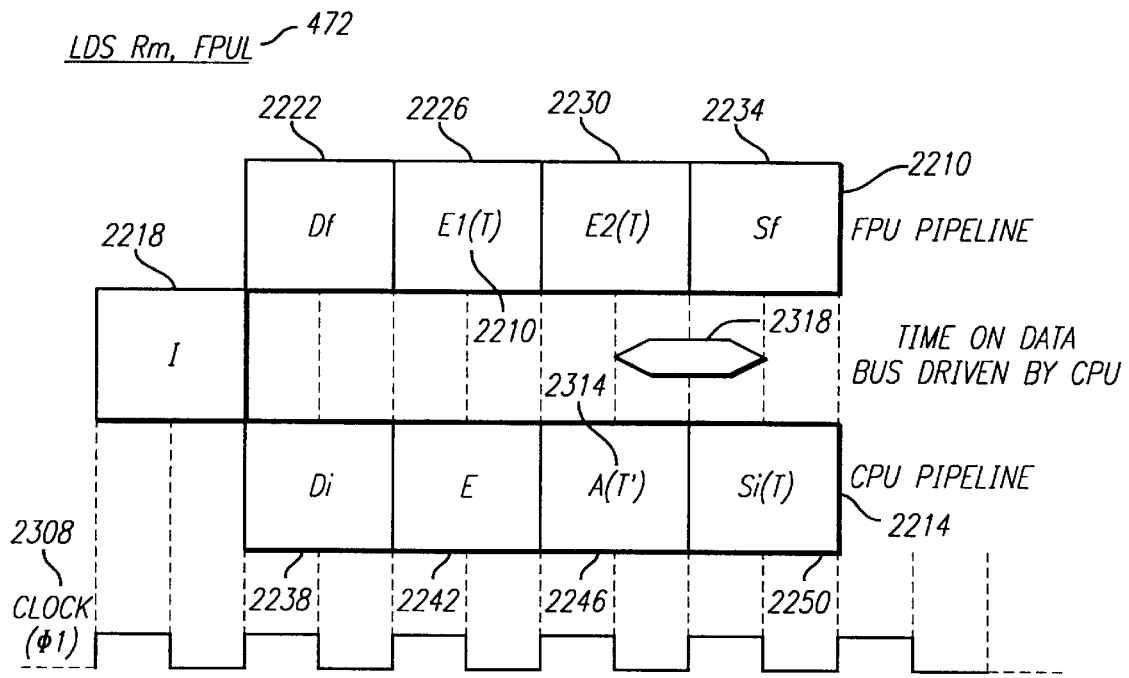
FIG. 23 (a and b) shows a diagram of the FPU pipeline and the CPU pipeline and the timing for the transfer of data between these two pipelines, in accordance with a preferred embodiment of the invention.

Some instructions call for data movement between the FPU pipeline 2210 and the CPU pipeline 2214. An example of such an instruction is the CPU load to communication register instruction 2072 "LDS Rm, FPUL" using data path one 2022. FIG. 23(a) shows the FPU pipeline 2210 and the CPU pipeline 2214 and the timing for the transfer of data between these two pipelines 2210, 2214. The pipeline structure is as explained in FIG. 22. Note that each stage of the pipeline also corresponds to a single clock cycle of, for instance, a phase one clock 2308, (for clarity, a phase two clock is not shown). The CPU load to communication register instruction 2072 is a CPU 1818 instruction. But as explained above, all instructions are decoded by both decode stages 2222, 2238 of the FPU and CPU pipelines 2210, 2214. So, upon decoding the CPU load to communication register instruction 2072, the Df stage 2222 determines that the FPU pipeline 2210 will be involved, since the FPU 1814 controls access to the FPUL register 2018. Initially, the CPU load to communication register instruction 2072 is executed by the CPU pipeline 2214 in the E stage 2242. At the same time, the E1 stage 2226 of the FPU pipeline 2210 passes the instruction through without any action, as designated by the letter "T" 2310. In other words, the CPU load to communication register instruction 2072 simply is pushed through the E1 stage 2310.

Generally, each stage of the pipelines 2210, 2214 takes one cycle to execute. But there are special situations when an instruction spends more than one cycle in a pipeline stage. In that case, an instruction is recirculated through that particular pipeline stage. For example, the floating point divide instruction "FDIV", as shown on page A40 of the Appendix A, has a latency of thirteen cycles. Here, latency is a measure of the total number of cycles that an instruction spends in the execution stages 2226, 2230 of, for instance, the FPU pipeline 2210. A floating point instruction spends one cycle in the E2 stage 2230, from which it is apparent that the floating point divide instruction spends twelve cycles in the E1 stage 2226. Also shown on page A40 of the Appendix A is the pitch of the floating point divide instruction, which is the measure of the clock cycles before an instruction following the current instruction can start execution in a pipeline. For example, the next instruction following the floating point divide instruction can begin execution after twelve cycles, since the pitch of the floating point divide instruction equals twelve cycles. A pitch of value twelve indicates that the floating point divide instruction spends twelve cycles in the E1 stage 2226. Consequently, the next floating point instruction has to wait twelve clock cycles before entering the E1 stage 2226.

Returning to the example of the load to communication register instruction 2072, since the same instruction flows in both the FPU and the CPU pipelines 2210, 2214, the resources of the E1 stage 2226 will be held for the same amount of cycles that the E stage 2242 of the CPU pipeline 2214 executes. Next, the A stage 2246 of the CPU pipeline 2214 sources the contents of the register, referenced "Rm" in the LDS CPU load to communication register instruction 2072, onto the data bus 1822. Since this is not an instruction that requires cache memory access, the A stage 2246 only loads the data bus from the CPU register file 2010. A T' 2314 indicates that no memory access takes place.

While the CPU pipeline is placing the contents of register "Rm" on the data bus 1822, the E2 stage 2230 of the FPU pipeline 2210 is pushing the instruction through without any action, as indicated by the letter "T". The CPU stage A 2246 makes the contents of the register Rm available on the data bus 1822 for a limited period of time, data-ready time 2318. "Data-ready time" is the time that the data bus is busy with the data transfer related to the CPU load to communication register instruction 2072. During the period 2318 that the data is available on the data bus 1822, the write back stage Sf 2234 of the FPU pipeline 2210 retrieves the data on the data bus 1822 and stores it in the register FPUL.

Figure 23B:
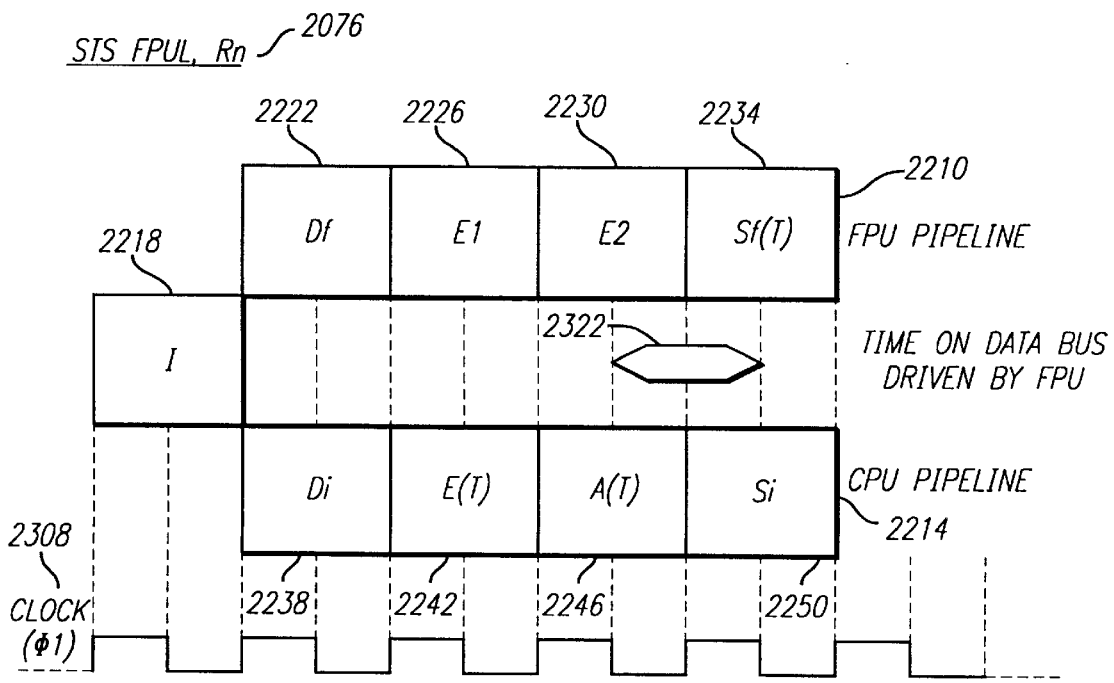

The CPU store instruction "STS FPUL, Rn" 2076 is executed similarly by the two pipelines 2210 and 2214, as shown in FIG. 23(b). The CPU store instruction 2076 copies the contents of FPUL register into a CPU general purpose register Rn. However, in the case of the CPU store instruction 2076, the FPU 1814 controls the period 2322 of time that the contents of the FPUL register is available on the data bus 1822.

FIG. 24 is a more detailed circuit diagram 2406 of the FPU pipeline 2210. Shown in the circuit of FIG. 24 are latches 2414, 2418, 2422, and 2426 included in the FPU pipeline stages 2222, 2226, 2230, and 2234, respectively. The FPU pipeline stages 2222, 2226, 2230, and 2234 store their outputs in their respective latches 2414, 2418, 2422, and 2426 at either a down edge of a first phase 2408, 2308 of the clock or at a down edge of a second phase 2410 of the clock. Also shown are bypass signals 2428 as further discussed below. The function of the FPU pipeline circuit 2406 is illustrated by examples discussed immediately and also further below. In the example of the CPU load to communication register instruction 2072, the FPU decode stage Df 2222 controls the retrieval of the contents of register Rm from the data bus 1822 by asserting a select signal on the select signal path 2430 of a multiplexer 2434, such that the data is loaded into the FPUL register 2018.

Besides the floating point instruction groups 2058, 2062, 2064, and 2068 shown in FIG. 20, page A31 of the Appendix A lists, as mentioned above, additional instructions. In particular, Table 3 of the Appendix A on page A31 lists a floating point multiply and accumulate, FMAC, instruction "FMAC FR0, FRm, FRn." FIG. 25 is a basic FMAC circuit 2510 that executes the FMAC instruction. The FMAC circuit may be that described in commonly owned U.S. patent application entitled "Fast Method of Floating-Point Multiplication and Accumulation," application Ser. No. 08/544,159, which is hereby incorporated by reference. In FIG. 25, floating point multiplier 2514 multiplies the contents of floating point register FR0 2518 by the contents of the floating point register FRm 2522. The contents of the floating point register FRn 2526 are coupled to a pre-normalizer 2530. The letters "m" and "n" designate any of the floating point registers 2014 in FIG. 20. Both the pre-normalizer 2530 as well as the multiplier 2514 are coupled to an adder, such as a carry propagation adder 2534. The output of the adder 2534 is coupled to a normalizer 2538, which is coupled to a leading one detector 2540. The output 2542 of the normalizer 2538 is coupled to the floating point register FRn 2546.

Preferably, the FMAC 2510 functions by accumulating the output 2542 of the FMAC 2510 into the floating point register FRn 2546. For example, several consecutive FMAC instructions may be executed. The need for executing multiple consecutive FMAC instructions arises in three-dimensional graphics and video game applications. Each FMAC instruction then can accumulate the result of the FMAC operation into a different floating point register 2546. This avoids pipeline stalls between consecutively executed FMAC instructions. A stall in one pipeline stage does not stop the actions in other stages of the pipeline. Instead a NOP (no operation) instruction is inserted into the stage having a stall. Then the NOP is allowed to flow through the pipeline. A dependency stall can happen when consecutive FMAC instructions accumulate into the same floating point register. However, in this embodiment, consecutive FMAC operations can accumulate into different floating point registers. This permits avoiding dependency stalls between consecutive FMAC instructions.

Other instructions listed in Table 1 are the floating point load immediate "0" and "1" instructions. Typically, RISC microprocessors do not have such floating point instructions. Instead of having these instructions, other RISC floating point instruction sets require a sequence of instructions to load a floating point value of "0" or "1" into a floating point register. Other RISC microprocessors dedicate floating point registers (e.g., seven out of thirty-two registers) to hold the constants "0" and "1". In an instruction set, such as this embodiment, dedicating registers would severely limit the availability of floating point registers for scheduling by the compiler. The circuit diagram for executing the load immediate floating point "0" or load immediate floating point "1" instruction is shown in FIG. 26.

FIG. 26 shows a circuit diagram 2608 for an immediate load of a floating point zero or a one. Circuit 2608 receives from the fetch stage I 2218 (see FIG. 22) the floating point load immediate zero or one instruction 2610. Having decoded the instruction, the decode stage Df 2222 of the FPU pipeline 2210 lets the load immediate instruction 2610 move to the next stage E1 2226. Next, the E1 stage 2226 lets the load immediate instruction 2610 pass through, as indicated by the letter "T" 2310. Similarly, the phase one part 2614 of the E2 stage 2230 lets the load immediate instruction 2610 pass through. The phase two part 2618 of the E2 stage 2230 includes an adder, such as a Carry Propagation Adder (CPA) 2622 that is coupled to the phase one part 2614 of the E2 stage and that is also coupled to the output 2626 of a multiplexer 2630. The multiplexer 2630 has several inputs. One of the multiplexer inputs is a zero signal 2634. Another input is a one signal 2638. The decode stage Df 2222 can apply a constant select signal at selector 2642 of the multiplexer 2630. Whether the Df stage 2222 selects the zero signal 2634 or the one signal 2638 depends on which of the two load immediate instructions 2610 the Df stage 2222 receives from the fetch stage 2218. An output 2646 of the adder 2622 is coupled to the floating point register file 2014, which is a part of the phase one part 2650 of the Sf stage 2234.

Figure 27:
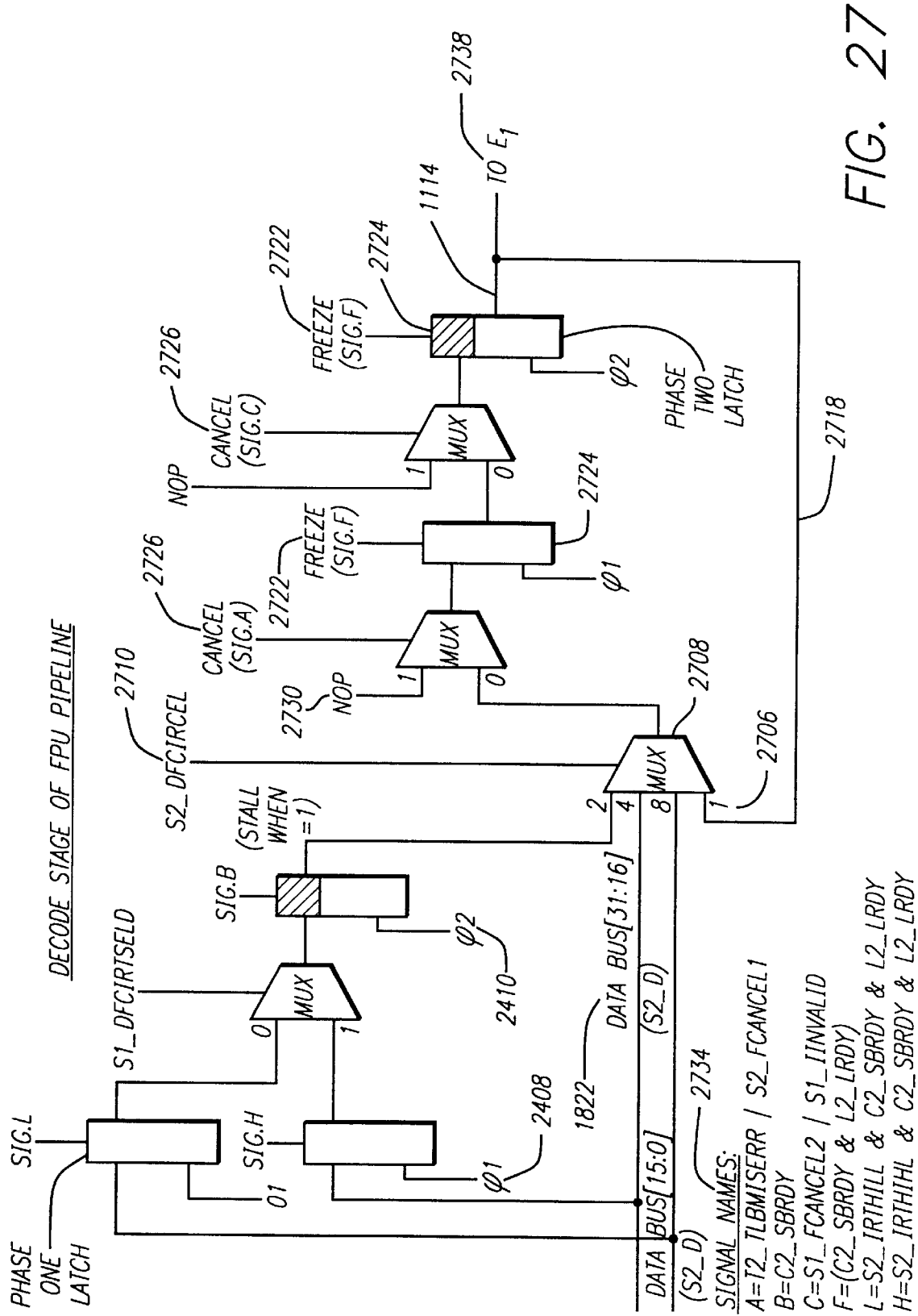
FIG. 27 is a diagram illustrating a decode stage of the FPU pipeline, in accordance with a preferred embodiment of the invention.

FIG. 27 is a circuit diagram of the decode stage Df 2222 of the FPU pipeline 2222. The function of the decode stage Df 2222 depends on stall signal 1410 (see FIG. 28), which is generated by the decode stage Di 2238 of the CPU 1818. This stall signal 1410 is used in the execution stage E1 2226 of the FPU pipeline 2210 to introduce a NOP 1414 in the E1 stage 2226. When the Df stage 2222 detects a stall condition (see FIG. 24), the Df stage 2222 of FIG. 27 recirculates an instruction being decoded in Df 2222 from a Df output 2714. Recirculation via recirculation path 2718 is achieved by a control signal 2710 from Di 2238 selecting input 2706 (selector=1) of a multiplexer 2708.

FIG. 27 also shows the freeze signal selector paths 2722. As explained above, a freeze signal causes a pipeline to stop all execution in the entire pipeline. Similarly to the stall signal, a freeze signal is applied to both pipelines 2210, 2214, as explained above. The freeze signal 2722 disables the latches 2724. Also shown in FIG. 27 is a cancel signal selector path 2726. Applying a cancel signal at the cancel selector path 2726 cancels any instruction at that point in the pipeline by inserting a NOP 2730. Table 2734 further describes the signals applied to the decode stage 2222 of the FPU pipeline 2210. The explanation of symbolic signals (e.g. sig.A, sig.B, etc.) is in C-language notation. In Table 2734, the vertical lines in the signal name definitions represent logical "OR". The "&'s" represent logical AND's. The "~" represents a logical inversion. These signal names are listed with explanations in Appendix A.

Figure 28:
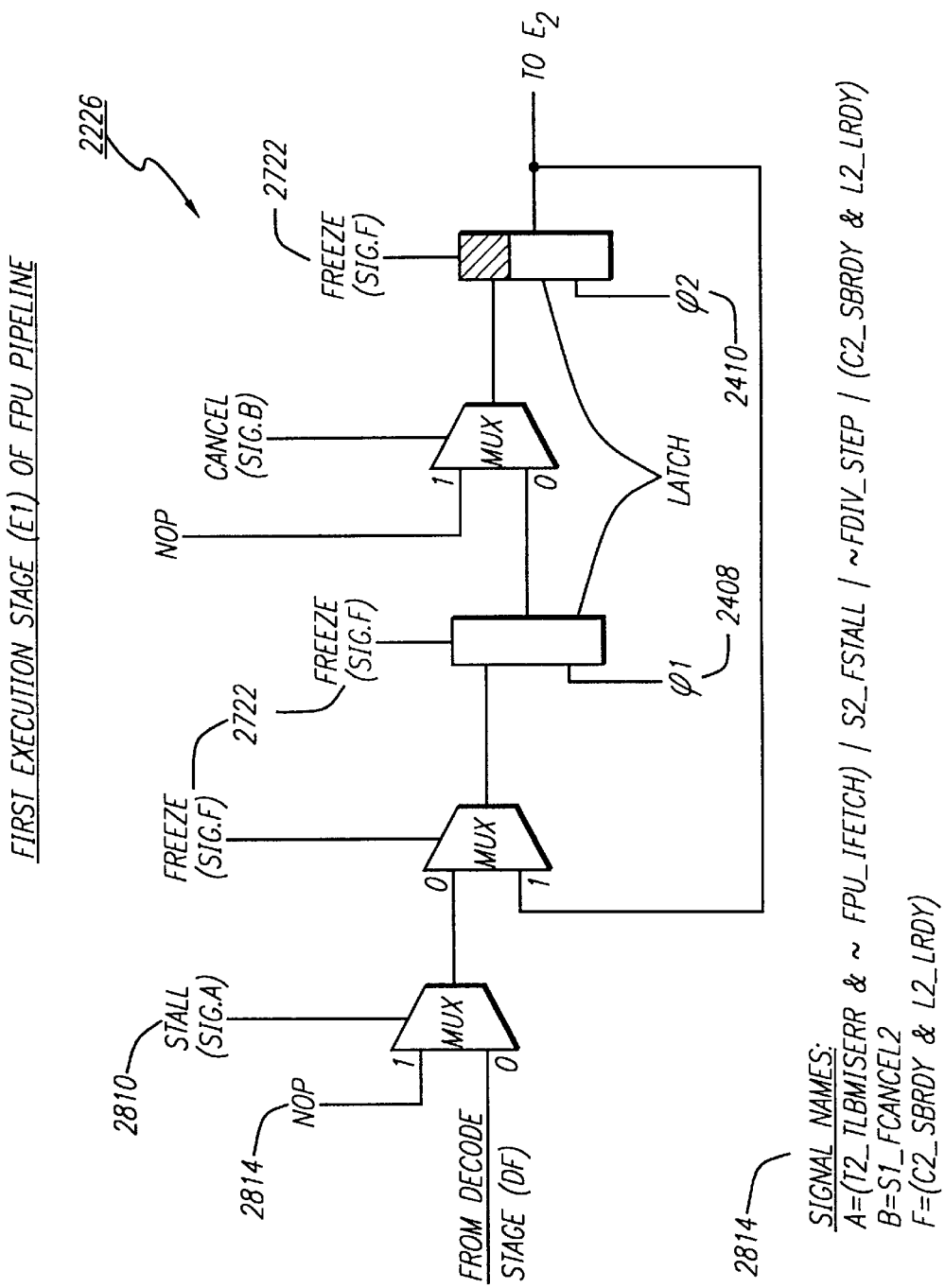
FIG. 28 is a diagram illustrating a first execution stage E1 of the FPU pipeline, in accordance with a preferred embodiment of the invention.

FIG. 28 shows a diagram of the first execution stage E1 2226 of the FPU pipeline 2210. When a stall is appropriate in the first execution stage 2226, the decode stage 2238 of the CPU 2238 applies a stall signal at the stall signal path 1410, as described above. This prevents the output 2738 of the FPU decode stage 2222 from being inserted into the E1 stage 2226. Instead, assertion of the stall signal at path 1410 causes a NOP to be inserted into the E1 stage 2226. The application of the freeze and cancel signals in FIG. 28 is similar to that of FIG. 27. The signals are explained in further detail in Table 1414.

Figures 1, 29:
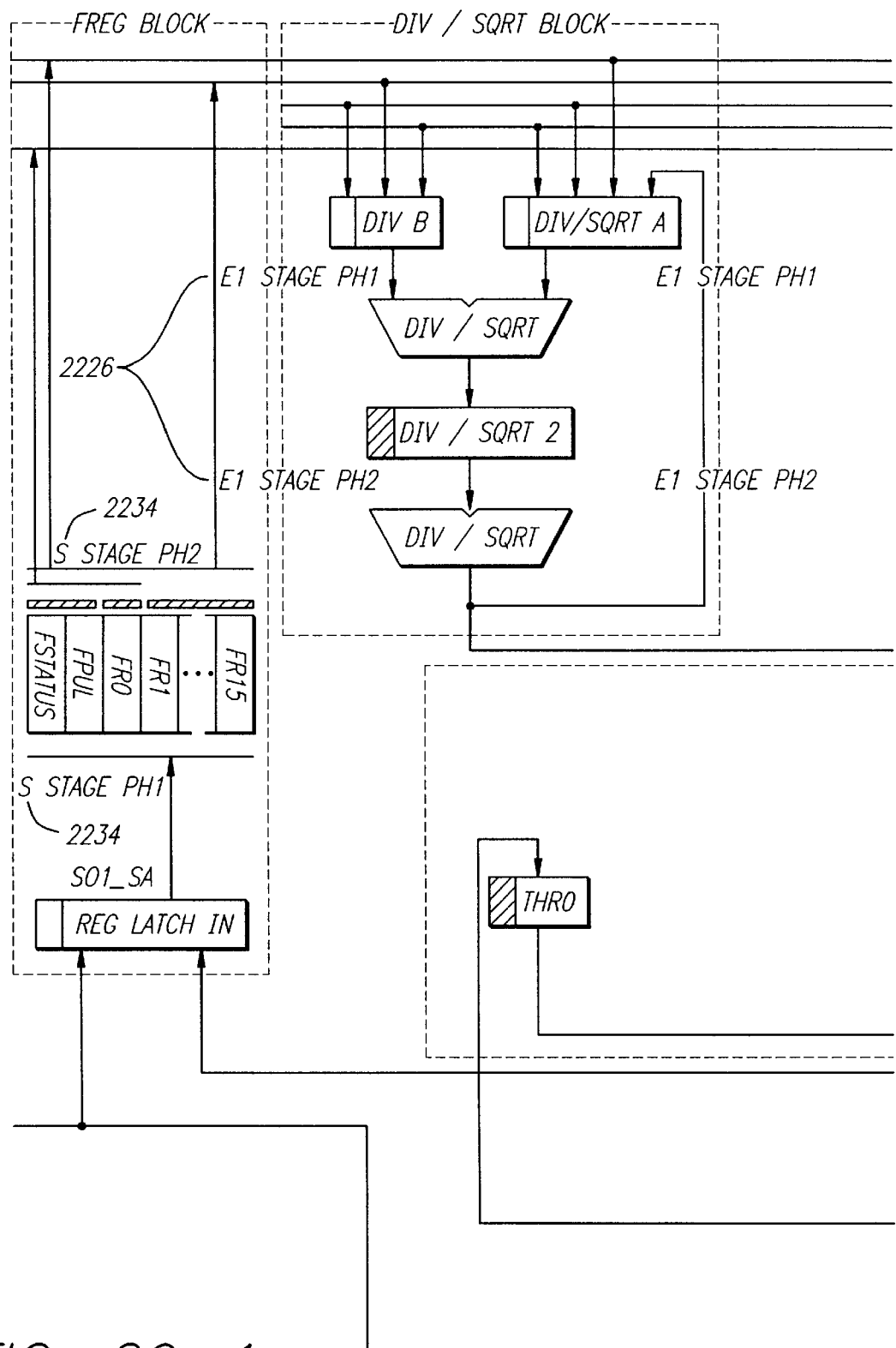
FIG. 29 is a detailed circuit diagram of the FPU pipeline, in accordance with a preferred embodiment of the invention.
Figures 2, 29:
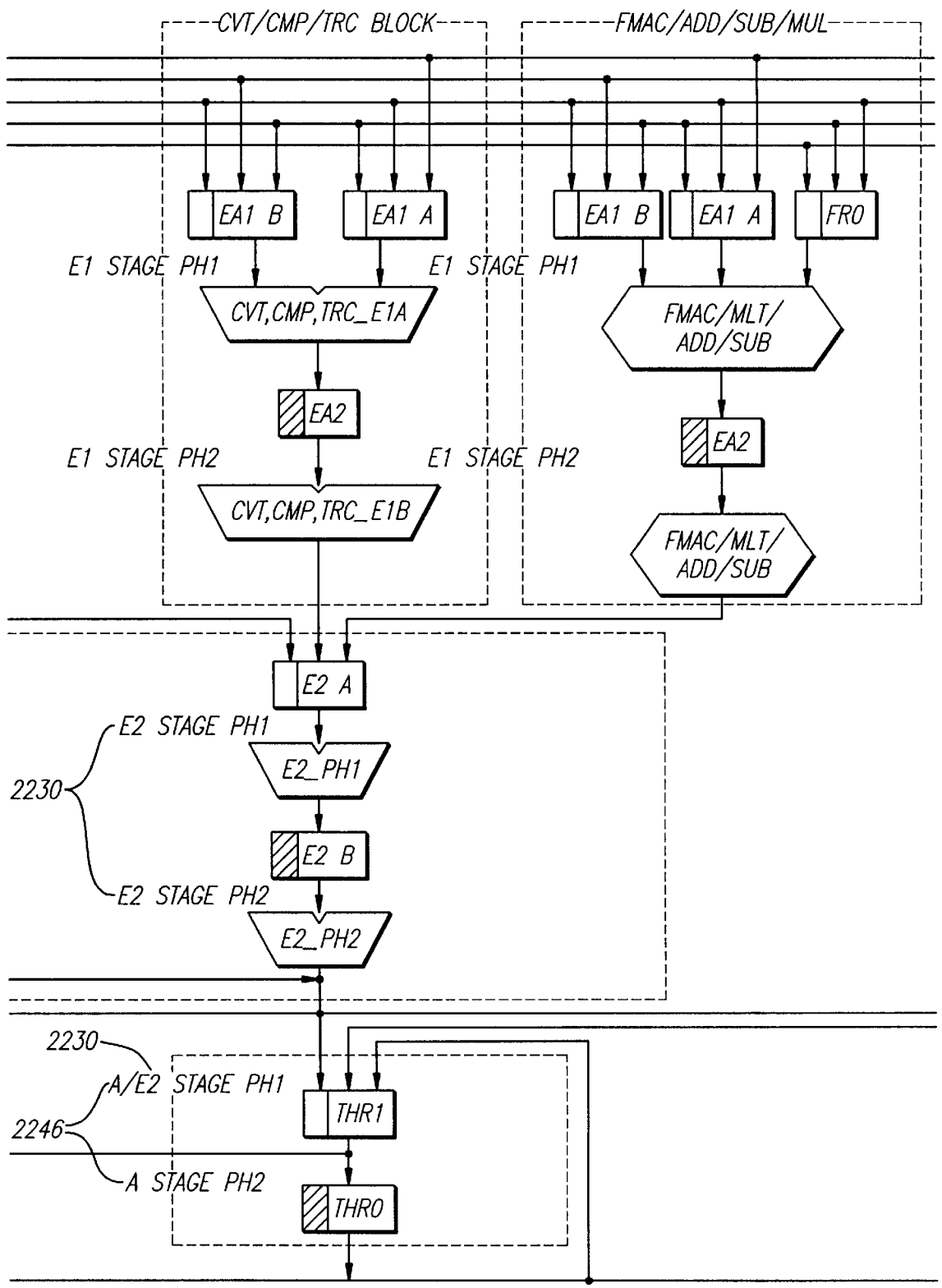
Figures 3, 29:
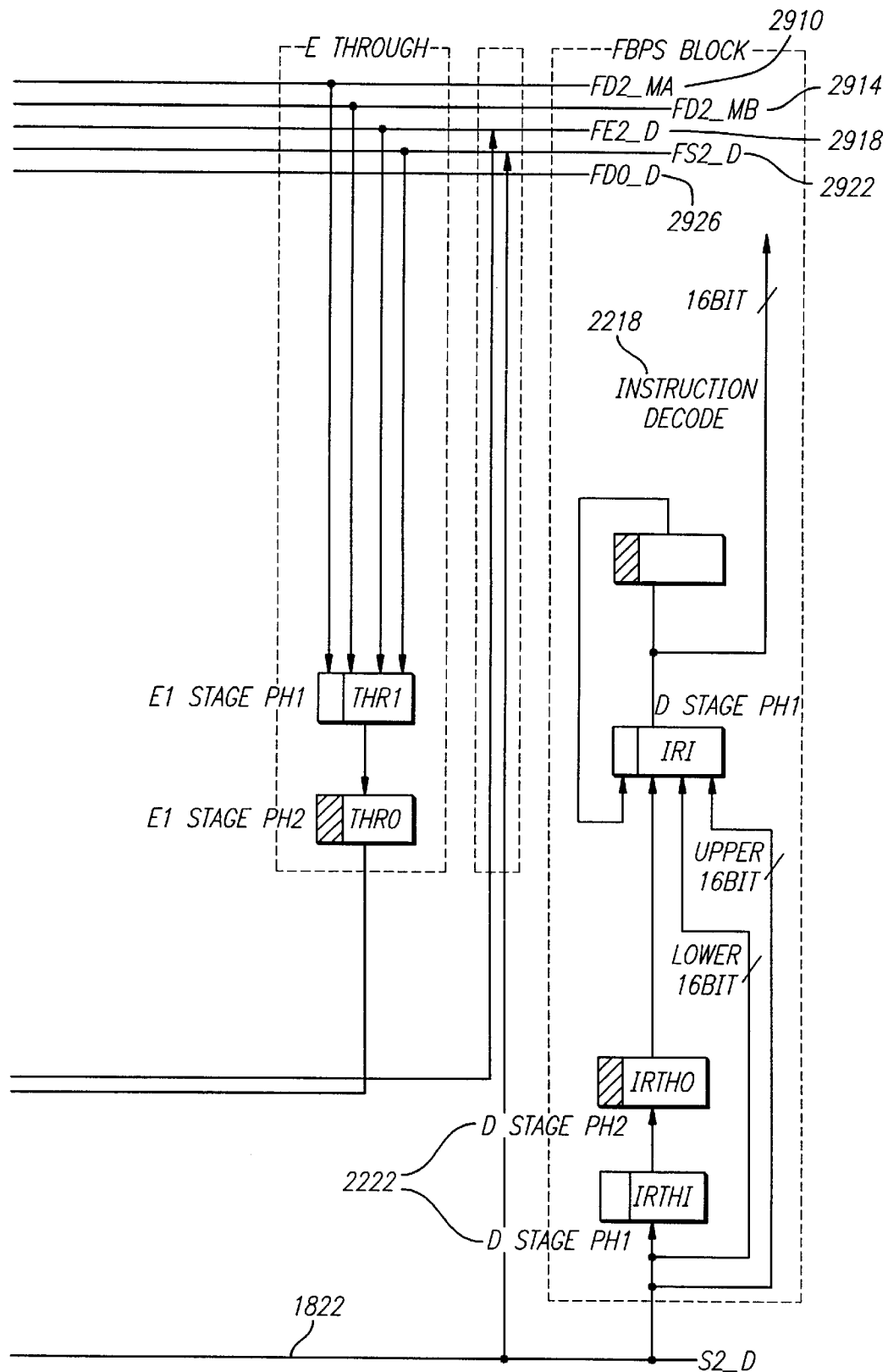

FIG. 29 is a detailed circuit diagram of stages Df 2222, E1 2226, E2 2230, and Sf 2234 of the FPU pipeline 2210. The FPU pipeline circuit 1508 shows several inputs. Input 1510 is for a first operand and input 1514 is for a second operand of an FPU or CPU instruction. Input 1518 accepts bypass data for recirculating the output of the E2 stage 2230 back to an input of the E1 stage. Input 1522 is for bypassing the contents of data bus (S2-D) 1822 back to the input of the E1 stage. Input 1526 is an input from the FR0 register of the register file 2014. Based on the above description and the descriptive names in FIG. 29, one of ordinary skill in the art will understand the remaining portions of circuit 1508.

The invention provides an apparatus for use in a reduced instruction set computer having a memory. The apparatus comprises a floating point unit operable with a 16-bit fixed length floating point instruction set stored in the memory. The apparatus may further comprise a floating point register file having a plurality of floating point registers, wherein the 16-bit fixed length floating point instruction set comprises a floating point multiplication and accumulation instruction for accumulating into any one of the plurality of floating point registers of the floating point register file, for executing consecutive floating point multiplication and accumulation instructions without dependency stalls. The apparatus may further comprise a first floating point register, wherein the 16-bit fixed length floating point instruction set comprises a load immediate instruction for loading a floating point zero into the first register. The apparatus may further comprise a second floating point register, wherein the load immediate instruction is for loading a floating point zero into the second register. The apparatus may further comprising a first floating point register, wherein the 16-bit fixed length floating point instruction set comprises a load immediate instruction for loading a floating point one into the first register. The apparatus may still further comprise a second floating point register, wherein the load immediate instruction is for loading a floating point one into the first register and the second register. The floating point unit may comprises a floating point operation circuit; a leading one detector and normalizer circuit coupled to the floating point operation circuit, the leading one detector and normalizer circuit having an output for coupling data comprising a higher part and a lower part; and a register coupled to the output of the leading one detector and normalizer circuit, the register having an output for coupling the higher part of the leading one detector and normalizer circuit.

The invention further provides a floating point unit coupled to a processor. The floating point unit comprises a communication register coupled to the processor for exchanging data between the floating point unit and the processor.

The invention also provides a reduced instruction set computer having a memory, which comprises a floating point unit comprising a communication register; and a processor coupled to the communication register for exchanging data between the floating point unit and the processor, the processor for initiating fetching of data from the memory for the floating point unit. The processor may fetch instruction for the floating point unit. The processor may initiate data fetches from memory for the floating point unit.

The invention further provides a floating point unit comprising a floating point operation circuit having an input for coupling to a floating point number and an output; a denormalized number detector coupled to the floating point operation circuit for detecting a denormalized characteristic of the floating point number; a selector coupled to the input and output of the floating point operation circuit, the selector having an output; and a selector signal circuit coupled to the denormalized number detector and to the selector for selecting for the output of the selector a zero floating point number, when a denormalized floating point number is coupled to the input of the floating point operation circuit, and otherwise for selecting the output of the floating point operation circuit for the output of the selector.

These embodiments can be characterized as a Floating Point Unit (FPU) with a sixteen-bit fixed length instruction set for thirty-two bit data. The FPU operates as part of RISC microprocessor. The CPU does all memory addressing. Furthermore, data between the CPU and the FPU is transferred via a communication register. An FPU pipeline is synchronized with a CPU pipeline. The sixteen-bit fixed length instruction group has special instructions for immediate loading of a floating point zero and/or a floating point one. Two instructions are dedicated for this purpose. Furthermore, the 16-bit fixed length instruction group of the FPU flushes denormalized numbers to zero. The instruction set also rounds floating point numbers to zero. An FMAC instruction of the instruction set has the capability to accumulate into a different register for consecutive FMAC operations.

Several preferred embodiments of the present invention have been described. Nevertheless it will be understood that various modifications may be made without departing from the spirit and scope of the invention. Thus, the present invention is not limited to the preferred embodiments described herein, but may be altered in a variety of ways, which will be apparent to person skilled in the art.

What is claimed is:

1. A method of using a floating point pipeline to execute floating point operations and an integer pipeline to execute integer and memory addressing operations, the method comprising the step of:

synchronizing the floating point pipeline with the integer pipeline by having a stall and a freeze on one pipeline always effect a stall and a freeze on the other.

2. A method of synchronizing operation of a floating point pipeline and an integer pipeline, the method comprising the step of always stalling both pipelines at substantially the same time.

3. The method of claim 2, where the step of stalling includes the integer pipeline sending a stall signal to the floating point pipeline.

4. The method of claim 3, wherein the integer pipeline sends the stall signal for a load use stall.

5. The method of claim 3, wherein the integer pipeline sends the stall signal for stalling in case of a memory access conflict between instructions.

6. The method of claim 2, further comprising the step of always freezing both pipelines at substantially the same time.

7. The method of claim 6, wherein the step of freezing includes receipt by the floating point pipeline and the integer pipeline of a freeze signal.

8. The method of claim 2, to maintain precise exceptions, further comprising the step of asserting a busy signal for stalling both pipelines when an instruction in one pipeline is being executed while another instruction in the same pipeline is ready for execution.

* * * * *